(12) United States Patent
Lu et al.

(10) Patent No.: US 10,861,177 B2
(45) Date of Patent: Dec. 8, 2020

(54) METHODS AND SYSTEMS FOR BINOCULAR STEREO VISION

(71) Applicant: ZHEJIANG DAHUA TECHNOLOGY CO., LTD., Hangzhou (CN)

(72) Inventors: Wei Lu, Hangzhou (CN); Qiankun Li, Hangzhou (CN); Shizhu Pan, Hangzhou (CN); Miao Cheng, Hangzhou (CN); Xiangming Zhou, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 81 days.

(21) Appl. No.: 15/775,800

(22) PCT Filed: Nov. 9, 2016

(86) PCT No.: PCT/CN2016/105174
§ 371 (c)(1),
(2) Date: May 11, 2018

(87) PCT Pub. No.: WO2017/080451
PCT Pub. Date: May 18, 2017

(65) Prior Publication Data
US 2018/0322648 A1 Nov. 8, 2018

(30) Foreign Application Priority Data

Nov. 11, 2015 (CN) .......................... 2015 1 0775971
Nov. 4, 2016 (CN) .......................... 2016 1 0971609
Nov. 4, 2016 (CN) .......................... 2016 1 0971878

(51) Int. Cl.
G06T 7/593 (2017.01)
G06T 7/80 (2017.01)
G06K 9/62 (2006.01)

(52) U.S. Cl.
CPC ............ *G06T 7/593* (2017.01); *G06K 9/6269* (2013.01); *G06T 7/85* (2017.01); *G06T 2207/10021* (2013.01); *G06T 2207/20081* (2013.01)

(58) Field of Classification Search
None
See application file for complete search history.

(56) References Cited

U.S. PATENT DOCUMENTS 6,111,582 A * 8/2000 Jenkins .................. G06T 15/40
345/421
7,636,105 B2 12/2009 Sun et al.
(Continued)

FOREIGN PATENT DOCUMENTS

CN 101251373 A 8/2008
CN 101504287 B 1/2011
(Continued)

OTHER PUBLICATIONS

International Search Report for PCT/CN2016/105174 dated Feb. 16, 2017, 4 pages.
(Continued)

Primary Examiner — Fayyaz Alam
(74) Attorney, Agent, or Firm — Metis IP LLC

(57) ABSTRACT

A system and method for binocular stereo vision is disclosed. The method includes acquiring a pair of images including a first image and a second image, the pair of images being captured by one or more cameras; obtaining a training model; determining a plurality of feature images according to the first image; determining one or more (Continued)

features of an object in the first image according to the training model and the plurality of feature images; determining a first area in the first image, the first area including at least one of the determined one or more features; obtaining depth information of the determined first area based on the first and second images; and determining a second area in the first image based on the determined first area and depth information, the second area including at least one of the determined first area.

20 Claims, 16 Drawing Sheets

(56) References Cited

U.S. PATENT DOCUMENTS

| | | | |
|---|---|---|---|
| 8,358,342 B2* | 1/2013 | Park | G06K 9/00771 348/143 |
| 8,872,925 B2 | 10/2014 | Xie et al. | |
| 2010/0232647 A1 | 9/2010 | Fujieda et al. | |
| 2012/0148097 A1 | 6/2012 | Park et al. | |
| 2013/0190089 A1* | 7/2013 | Wilson | G06F 3/017 463/36 |
| 2014/0368689 A1* | 12/2014 | Cao | G06K 9/52 348/222.1 |
| 2015/0016676 A1* | 1/2015 | Choi, II | G06K 9/00389 382/103 |
| 2016/0379375 A1 | 12/2016 | Lu et al. | |

FOREIGN PATENT DOCUMENTS

| | | |
|---|---|---|
| CN | 103231708 A | 8/2013 |
| CN | 103390164 A | 11/2013 |
| CN | 103763047 A | 4/2014 |
| CN | 103955920 A | 7/2014 |
| CN | 103983186 A | 8/2014 |
| CN | 104167109 A | 11/2014 |
| CN | 104236478 A | 12/2014 |
| CN | 104318561 A | 1/2015 |
| CN | 104574425 A | 4/2015 |
| CN | 104700414 A | 6/2015 |
| CN | 10596591 A | 11/2015 |
| CN | 105023010 A | 11/2015 |
| CN | 106650708 A | 5/2017 |
| JP | 6425990 B2 | 11/2018 |

OTHER PUBLICATIONS

Written Opinion of the International Searching Authority for PCT/CN2016/105174 dated Feb. 16, 2017, 4 pages.
First office action in Chinese Application No. 201510775971.8 dated Sep. 15, 2017, 9 pages.
Wei Lu, Research on key techniques of high-precision and real-time visual localization, 2015, pp. 7-122.
Pedro F. Felzenszwalb et al., Object Detection with Discriminatively Trained Part-Based Models, IEEE Transactions on Pattern Analysis and Machine Intelligence, IEEE Computer Society, 9(32): 1627-1645(2010).
The Extended European Search Report in European Application No. 16863627.2 dated Aug. 31, 2018, 10 pages.
Meng, Fanjie, Research on Panoramic 3D Object Tracking Method Based on Spherical Camera Model, China Master's Theses Full-text Database, 8, 91 pages.
First Office Action in Chinese Application No. 201610971609.2 dated Apr. 3, 2020, 18 pages.
First Office Action in Chinese Application No. 201610971878.9 dated May 22, 2020, 20 pages.

* cited by examiner

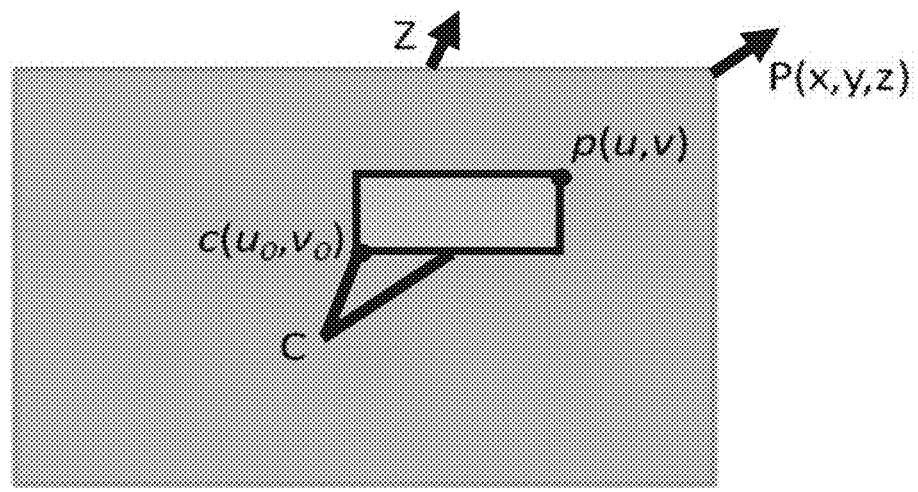
FIG. 10-A
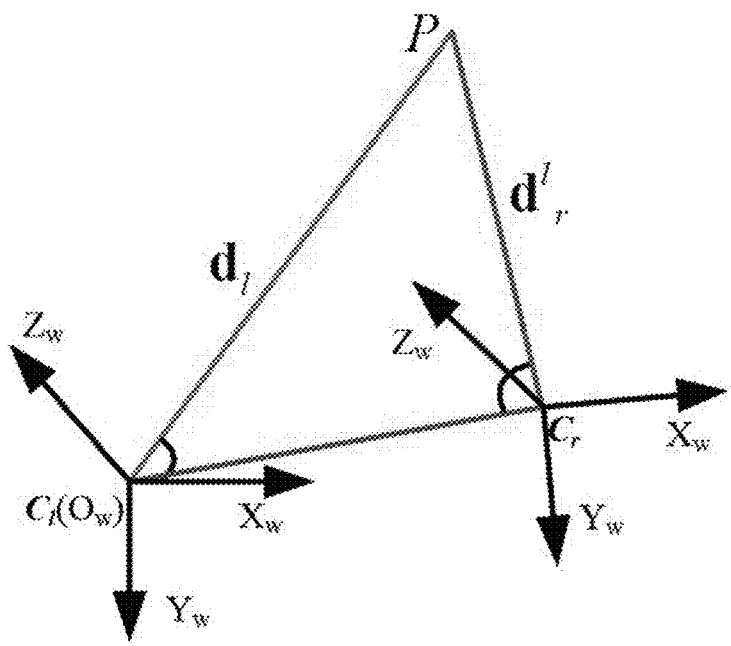
FIG. 10-B

1100

- 1110: Acquire pair of images including first image and second image captured by one or more cameras
- 1120: Generate pair of processed images including first processed image and second processed image in which ordinates of two corresponding pixels are equal according to pair of images
- 1130: Identify area in first processed image
- 1140: Determine parallax between first pixel in area in first processed image and second pixel corresponding to first pixel in second processed image
- 1150: Determine relationship between ordinate of first pixel in image coordinate and determined parallax
- 1160: Determine projection equation according to determined relationship
- 1170: Determine height and angle of one or more cameras according to projection equation

FIG. 11

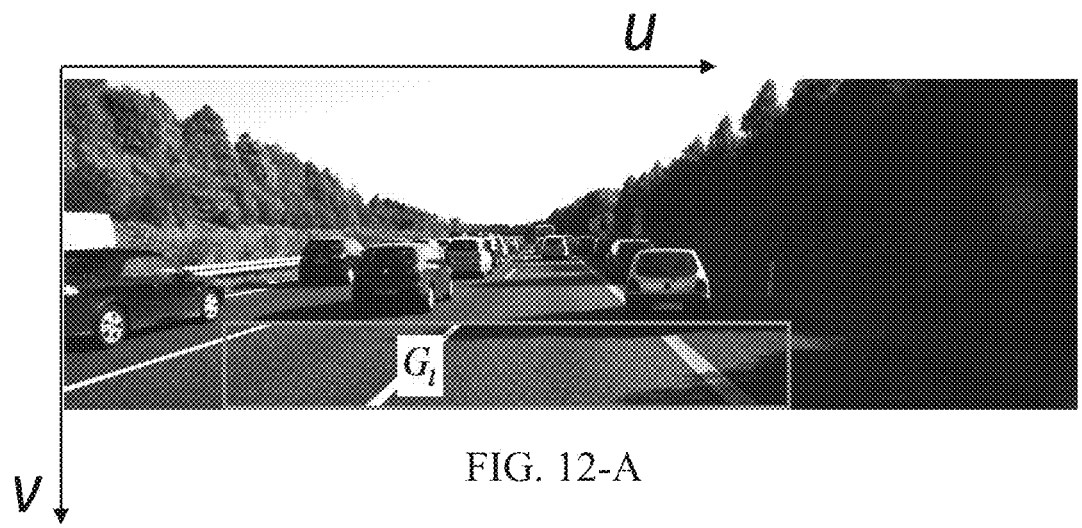
FIG. 12-A
FIG. 12-B

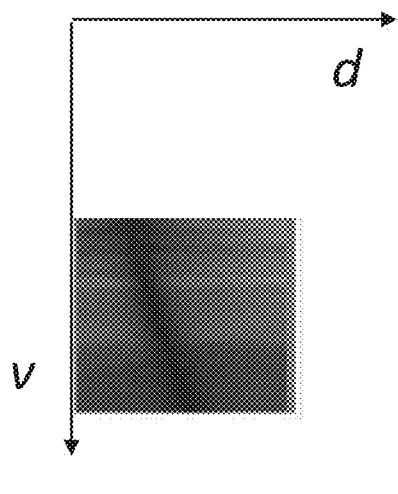
FIG. 13-A
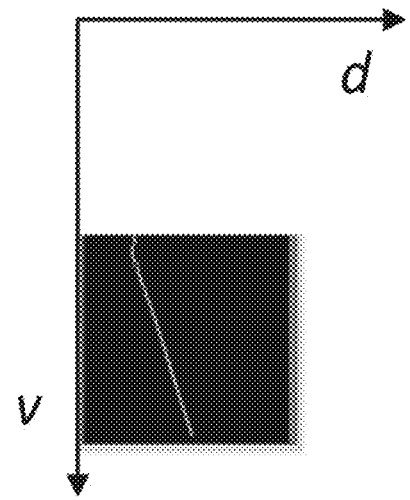
FIG. 13-B
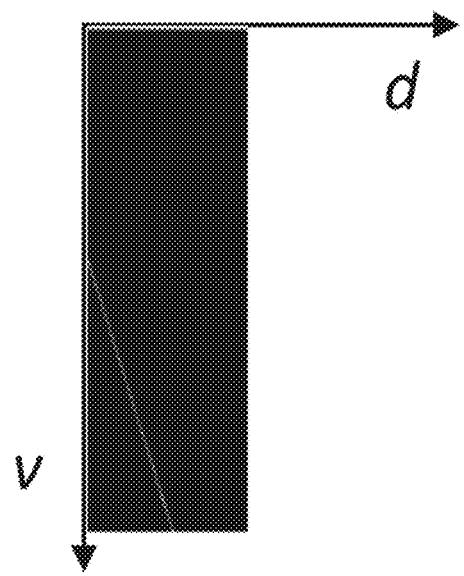
FIG. 13-C

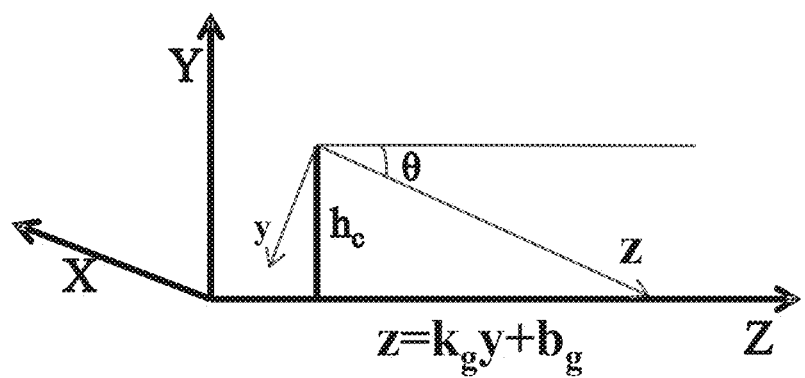
FIG. 14-A
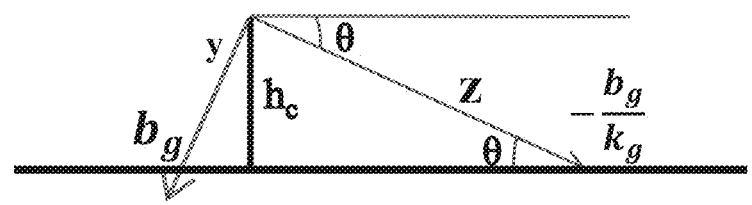
FIG. 14-B

FIG. 15-A
FIG. 15-B

FIG. 16-A
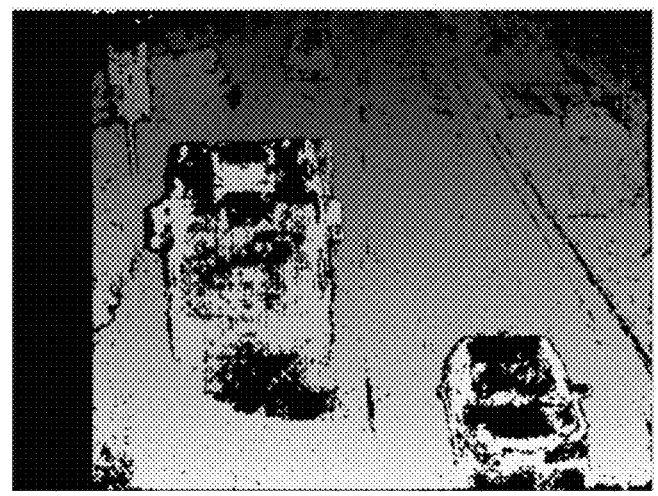
FIG. 16-B
FIG. 16-C

METHODS AND SYSTEMS FOR BINOCULAR STEREO VISION

CROSS-REFERENCE TO RELATED APPLICATIONS

This application is a U.S. national stage under 35 U.S.C. § 371 of International Application No. PCT/CN2016/105174, filed on Nov. 9, 2016, which claims priority of Chinese Patent Application No. 201510775971.8 filed Nov. 11, 2015, Chinese Patent Application No. 201610971609.2 filed Nov. 4, 2016, and Chinese Patent Application No. 201610971878.9 filed Nov. 4, 2016, the contents of which are hereby incorporated by reference to their entirety.

TECHNICAL FIELD

The present disclosure generally relates to vision system, and more particularly, to methods and systems for binocular stereo vision.

BACKGROUND

A traditional method of object detection may be based on one image captured by one camera. The image may be processed and analyzed to obtain position information of the object in the image. However, only contour information of the object is used to detect the object in the traditional method of object detection. The detection result of the traditional method of object detection may be inaccurate when there is an overlap of a plurality of objects in the image or there are a plurality of objects with a similar color. Therefore, it is desirable to provide a system and method of object detection to improve the accuracy of object detection.

SUMMARY

In a first aspect of the present disclosure, a method for binocular stereo vision is provided. The method may include one or more of the following operations. A pair of images including a first image and a second image may be acquired, wherein the pair of images are captured by one or more cameras. A training model may be obtained. A plurality of feature images may be determined according to the first image. One or more features of an object in the first image may be determined according to the training model and the plurality of feature images. A first area in the first image may be determined, wherein the first area includes at least one of the determined one or more features. Depth information of the determined first area may be obtained based on the first and second images. A second area in the first image may be determined based on the determined first area and depth information, wherein the second area includes at least one of the determined first area.

In some embodiments, the pair of images including the first image and the second image may be acquired by one or more of the following operations. An object in view of a first camera may be identified. A parameter of a second camera may be adjusted so that the object appears in view of the second camera. The pair of images captured by the first camera and the second camera may be acquired when the object appears in view of both the first and second cameras.

In some embodiments, the training model may be obtained by one or ore of the following operations. A plurality image samples may be obtained. An initial root filter may be generated according to the samples. An updating root filter may be generated according to the initial root filter. A part filter may be generated according to the updating root filter. The training model may be generated according to the samples and the part filter.

In some embodiments, the depth information of the determined first area may be obtained based on the first and second images by one or more of the following operations. The pair of images may be processed to generate a pair of processed images, wherein vertical coordinates in an image coordinate system of two corresponding pixels in the pair of processed images are equal. A pair of processed images may be generated according to the pair of images. A target pixel in the first area in a first processed image may be determined. A matching pixel of the target pixel in a second processed image may be determined. Depth information of the target pixel in a camera coordinate system may be determined according to the matching pixel. A height and a pitch angle of at least one of the one or more cameras may be determined. The depth information in the camera coordinate system may be transformed into depth information in a world coordinate system according to the height and the pitch angle.

In some embodiments, an origin of the image coordinate system may be a pixel in a highest position in a top left corner of the first image.

In some embodiments, an origin of the camera coordinate system may be an optical center of the camera capturing the first image.

In some embodiments, an origin of the world coordinate system may be a point in the real world.

In some embodiments, lenses of the one or more cameras may be fixed lenses, wherein the fixed lenses are non-rotatable along a first axis, a second axis, or a third axis, and the first axis, the second axis, and the third axis are perpendicular to each other.

In some embodiments, the height and the pitch angle of the at least one of the one or more cameras may be determined by one or more of the following operations. A third area in the first processed image may be identified. A parallax between a first pixel in the third area and a second pixel corresponding to the first pixel in the second processed image may be determined. A relationship between a vertical coordinate of the first pixel in the image coordinate system and the parallax may be determined. A projection equation may be determined according to the relationship. The height and the pitch angle of the at least one of the one or more cameras may be determined according to the projection equation.

In some embodiments, the depth information of the determined first area may be obtained based on the first and second images by one or more of the following operations. A calibration parameter of the first camera and the second camera may be obtained, wherein the calibration parameter includes a yaw angle, a pitch angle, a focal length or a three dimensional coordinate of an origin of a camera coordinate system in a world coordinate system of the first camera and the second camera in an initial state. A pair of pixels in the pair of images may be determined. An adjustment parameter of at least one of the first camera and the second camera may be obtained when the object appears in view of both the first and second cameras, wherein the adjustment parameter includes a yaw angle, a pitch angle, or a focal length of the first camera and the second camera. Depth information of the pair of pixels in the world coordinate system may be determined according to the calibration parameter and the adjustment parameter.

In some embodiments, the first camera and the second camera may have at least one rotatable lens, wherein the rotatable lens is a lens rotatable along a first axis, a second axis or a third axis, and the first axis, the second axis, and the third axis are perpendicular to each other.

In some embodiments, the initial state may be a state that rotation angles along the first axis, the second axis, and the third axis of the at least one rotatable lens of the first camera and the second camera are 0.

In a second aspect of the present disclosure, a system for binocular stereo vision is provided. The system may include an image acquisition module configured to acquire a pair of images including a first image and a second image, wherein the pair of images are captured by one or more cameras; a first detection information generation module configured to obtain a training model, determine a plurality of feature images according to the first image, determine one or more features of an object in the first image according to the training model and the plurality of feature images, and determine a first area in the first image, wherein the first area includes at least one of the determined one or more features; an depth information determination module configured to obtain depth information of the determined first area based on the first and second images; and a second detection information generation module configured to determine a second area in the first image based on the determined first area and depth information, wherein the second area includes at least one of the determined first area.

In a third aspect of the present disclosure, a non-transitory computer readable medium embodying a computer program product is provided. The computer program product may comprise instructions configured to cause a computing device to acquire a pair of images including a first image and a second image, wherein the pair of images are captured by one or more cameras; obtain a training model; determine a plurality of feature images according to the first image; determine one or more features of an object in the first image according to the training model and the plurality of feature images; determine a first area in the first image, wherein the first area includes at least one of the determined one or more features; obtain depth information of the determined first area based on the first and second images; and determine a second area in the first image based on the determined first area and depth information, wherein the second area includes at least one of the determined first area.

BRIEF DESCRIPTION OF THE DRAWINGS

FIG. 10-A is a schematic diagram of a direction vector of a point in the camera coordinate system according to some embodiments of the present disclosure;

FIG. 10-B is a schematic diagram of a triangular relationship among origins of the camera coordinate system of the first camera and the second camera and a point in the real world according to some embodiments of the present disclosure;

FIG. 11 is a flowchart of an exemplary process of determining a height and an angle of one or more cameras according to some embodiments of the present disclosure;

FIG. 12-A and FIG. 12-B are an exemplary pair of images with a selected reference area captured by one or more cameras according to some embodiments of the present disclosure;

FIG. 13-A is a schematic diagram of $G_{VD}$ according to some embodiments of the present disclosure;

FIG. 13-B is a schematic of $d^*(v)$ determined in $G_{VD}$ according to some embodiments of the present disclosure;

FIG. 13-C is a schematic diagram of $d=k*v+b*$ according to some embodiments of the present disclosure;

FIG. 14-A is a schematic diagram of a relationship of a camera coordinate and a world coordinate according to some embodiments of the present disclosure;

FIG. 14-B is a schematic diagram of geometrical relations between a height and an angle of the one or more cameras according to some embodiments of the present disclosure;

FIG. 15-A and FIG. 15-B illustrate two exemplary images produced by rectification according to some embodiments of the present disclosure;

FIG. 16-A illustrates an exemplary image produced by a process of first detection information generation according to some embodiments of the present disclosure;

FIG. 16-B illustrates an exemplary image produced by a process of depth information determination according to some embodiments of the present disclosure; and FIG. 16-C illustrates an exemplary image produced by a process of second detection information generation based on a first detection information and a depth information according to some embodiments of the present disclosure.

DETAILED DESCRIPTION

Figure 1:
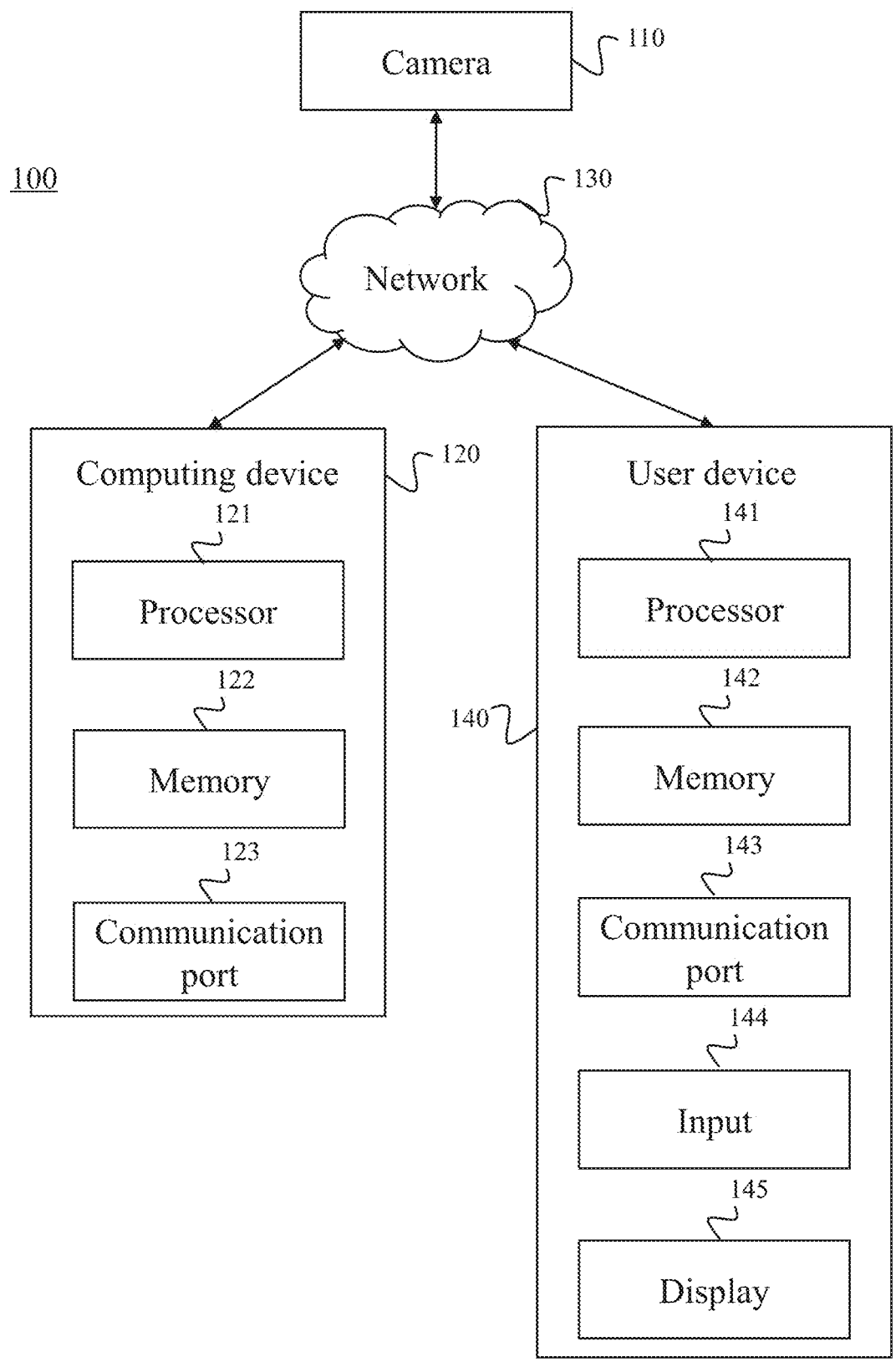
FIG. 1 is a block diagram of computer vision system according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well known methods, procedures, module, systems, devices, and/or drivers have been described at a relatively high-level, without detail, in order to avoid unnecessarily obscuring aspects of the present disclosure.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operation and functions of the related elements of structure and the combination of parts and economies of manufacture, may become more apparent upon consideration of the following description with reference to the accompanying drawing(s), all of which form a part of this specification. It is to be expressly understood, however, that the drawing(s) are for the purpose of illustration and description only and are not intended to limit the scope of the present disclosure. It is understood that the drawings are not to scale.

The present disclosure provided herein relates to a vision system. Specifically, the present disclosure relates to systems and methods for binocular stereo vision. According to some embodiments of the present disclosure, the method may include acquire a pair of images including a first image and a second image, the pair of images being captured by one or more cameras. According to the first image a plurality of feature images may be determined. According to a training model and the plurality of feature images one or more features of an object in the first image may be determined. A first area in the first image including at least one of the determined one or more features may be determined. Depth information of the determined first area based on the first and second images may be obtained and a second area in the first image may be determined based on the determined first area and depth information, the second area including at least one of the determined first area.

FIG. 1 is a block diagram of computer vision system 100 according to some embodiments of the present disclosure. Computer vision system 100 may be a system that uses one or more cameras and computers to simulate a biological vision and to identify, track, locate, and measure an object in the real world through acquiring, processing, and analyzing images. As illustrated in FIG. 1, computer vision system 100 may include a camera 110, a computing device 120, a network 130 and a user device 140. Camera 110 may be a device configured to capture one or more images. As used in this application, an image may be a still image, a video, a stream video, or a video frame obtained from a video. In some embodiments, camera 110 may be a digital camera, a web camera, a smartphone, a tablet, a laptop, a video gaming console equipped with a web camera, a camera with multiple lenses, etc. In some embodiment, camera 110 may include more than one camera configured to capture images. In some embodiment, camera 110 may be configured to capture two-dimensional (2D) images and/or three-dimensional (3D) images. For example, camera 110 may be a static camera, a pan-tilt-zoom camera, a moving camera, a stereoscopic camera, a structured light camera, a time-of-flight camera, etc. In some embodiments, camera 110 may also be a camera equipped with time-of-flight device, a Kinect sensor, a 3D laser scanner, a photographic scanner, etc. The type of camera 110 may vary, depending on the installation location and/or the type of objects to be monitored. In some embodiments, camera 110 may include two more cameras, each of which may be configured to capture one or more images. In some embodiments, camera 110 may be placed at different positions and configured to capture one or more images at each of the positions.

In some embodiments, camera 110 may also be configured to transmit the images captured to computing device 120 and/or user device 140 via network 130. Alternatively or additionally, camera 110 may be configured to transmit an image to computing device 120 and/or user device 140 in real time.

In some embodiments, camera 110 and computing device 120 may be packaged in a single device configured to perform functions of camera 110 and computing device 120 described in this disclosure. In some embodiments, camera 110 may also include one or more processors and memories configured to perform one or more processes and/or methods described in this disclosure. For example, camera 110 may be configured to capture images and transmit the images to computing device 120 and/or user device 140 via network 130 as described elsewhere in this disclosure.

Computing device 120 may be a web camera, a digital camera, a computer server, a desktop computer, a notebook computer, a tablet computer, a mobile phone, a personal digital assistant (PDA), or the like. Computing device 120 may include, among other things, a processor 121, a memory 122 and a communication port 123. In operation, processor 121 may execute computer instructions (program code) and perform functions in accordance with techniques described herein. Computer instructions may include routines, programs, objects, components, data structures, procedure modules and functions, which perform particular functions described herein. For example, processor 121 may receive and analyze a pair of images captured by camera 110. Processor 121 may also analyze one of the pair of images and determine first detection information. Processor 121 may also determine depth information of the pair of images. Processor 121 may further determine second detected information according to the first detection information and the depth information. Processor 121 may also calibrate parameters of camera 110 according to the pair of images. In some embodiments, processor 121 may include or be part of one or more known processing devices such as, for example, a microprocessor. In some embodiments, processor 121 may include any type of single or multi-core processor, mobile device microcontroller, central processing unit, etc.

Memory 122 may be configured to store one or more computer programs to be executed by processor 121 to perform exemplary methods disclosed herein. For example, memory 122 may be configured to store a training model that may be used by processor 121 to generate first detection information according to a pair of images captured by camera 110. Memory 122 may also be configured to store data and/or parameters used by processor 121 in methods described in this disclosure. For example, memory 112 may be configured to store calibration parameters of camera 110 for transmitting depth information in a camera coordinate system into depth information in a world coordinate system. Processor 121 may access the calibration parameters of camera 110 stored in memory 122. Processor 121 may also convert the depth information in the camera coordinate system into the depth information in the world coordinate system based on the accessed calibration parameters. As another example, memory 122 may store adjustment parameters for determining depth information of a pair of images captured by camera 110. Processor 121 may access the adjustment parameters stored in memory 122 and determine depth information of the pair of images captured by camera 110 based on the adjustment parameters.

Memory 122 may include a volatile or non-volatile, magnetic, semiconductor, tape, optical, removable, non-removable, or other type of storage device or tangible (i.e., non-transitory) computer-readable medium including, but not limited to, a ROM, a flash memory, a dynamic RAM and a static RAM.

Communication port 123 may be configured to transmit to and receive data from, among other devices, camera 110 and user device 140 over network 130. Network 130 may be any type of wired or wireless network configured to facilitate communications between the components of computer vision system. For example, network 130 may be a wired network, a local wireless network, (e.g., Bluetooth™, WiFi, near field communications (NFC), etc.), a cellular network, the Internet, or the like, or a combination thereof. Other known communication methods which provide a medium for transmitting data between separate devices are also contemplated.

User device 140 may be configured to receive data (e.g., image data) from camera 110 and/or computing device 120 via network 130. For example, user device 140 may be configured to receive a pair of images captured by camera 110 or receive one or more processed images from computing device 120. As another example, user device 140 may be configured to receive second detection information determined by computing device 120. User device 140 may be any type of computing device. For example, user device 140 may be a smart phone, a tablet, a personal computer, a wearable device (e.g., Google Glass™ or smart watches, and/or affiliated components), or the like, or a combination thereof. In some embodiments, user device 140 and computing device 120 may together be included in a computing device configured to perform exemplary functions of user device 140 and computing device 120 disclosed in this application.

User device 140 may include, among other things, a processor 141, a memory 142, a communication port 143, an input 144 and a display 145. Processor 141 may execute computer instructions (program code) and perform functions of user device 140 in accordance with techniques described herein. For example, processor 141 may be configured to receive image data from computing device 120 and/or camera 110 via network 130.

Memory 142 may be configured to store data transmitted from camera 110 and/or computing device 120 via network 130. For example, memory 142 may be configured to store image data from camera 110. In another example, memory 142 may be configured to store second detection information from computing device 120. Memory 142 may include a volatile or non-volatile, magnetic, semiconductor, tape, optical, removable, non-removable, or other type of storage device or tangible (i.e., non-transitory) computer-readable medium including, but not limited to, a ROM, a flash memory, a dynamic RAM and a static RAM.

Communication port 142 may be configured to transmit to and receive data from, among other devices, camera 110 and/or computing device 120 over network 130. Input 144 may be configured to receive inputs from the user and transmit the data/signal relating to the received inputs to processor 141 for further processing. Display 145 may be any device configured to display, among other things, images in the UI (User Interface) based on the display data fed by processor 141.

It should be noted that the above description of computer vision system 100 is merely provided for the purposes of illustration and not intended to limit the scope of the present disclosure. For persons having ordinary skills in the art, multiple variations or modifications may be made under the teachings of the present disclosure. However, those variations and modifications do not depart from the scope of the present disclosure. For example, computing device 120 and user device 130 may share one memory.

Figure 2:
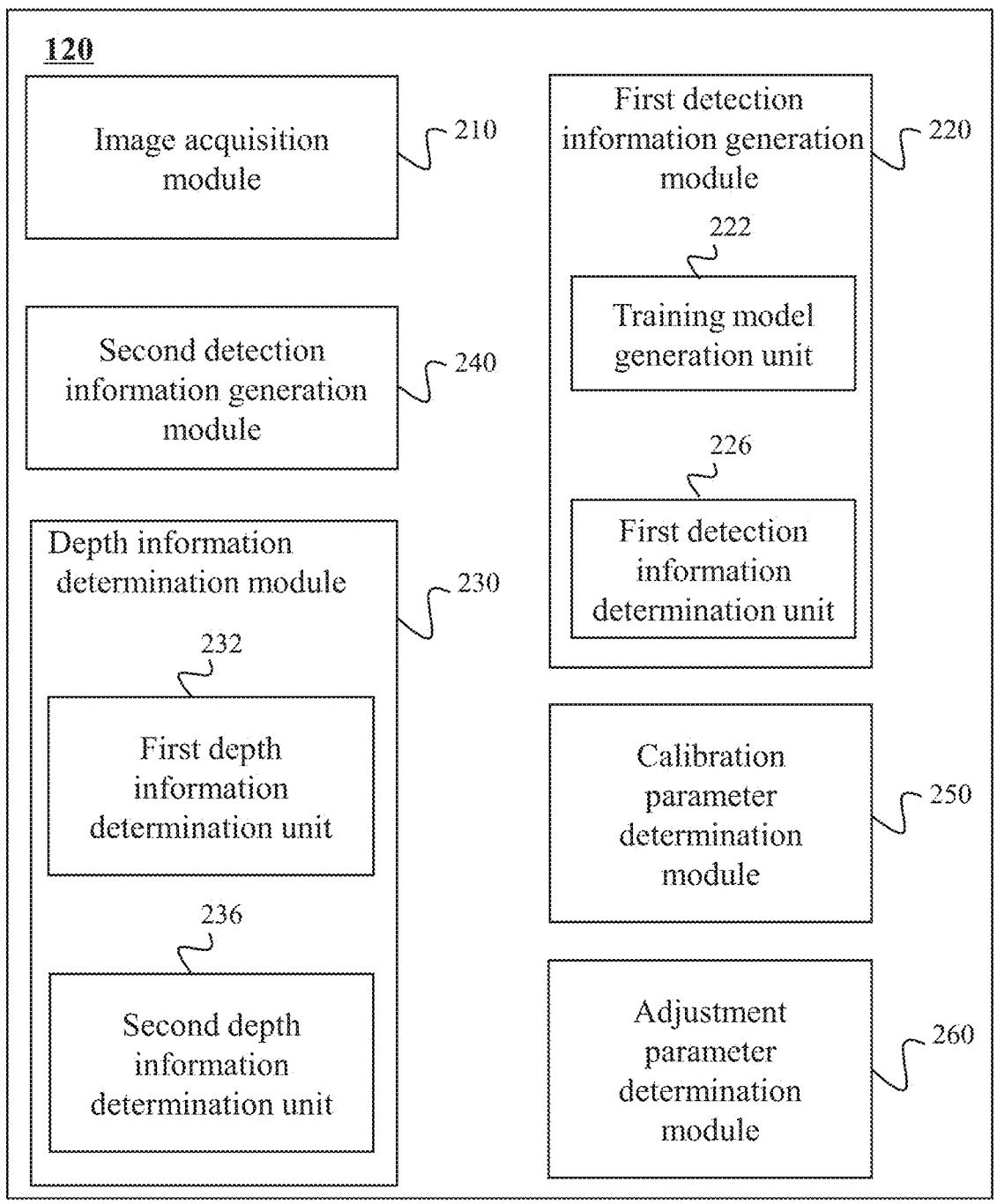
FIG. 2 is a block diagram illustrating an exemplary architecture of a computing device 120 according to some embodiments of the present disclosure.

FIG. 2 is a block diagram illustrating an exemplary architecture 200 of a computing device 120 according to some embodiments of the present disclosure. As illustrated, computing device 120 may include an image acquisition module 210, a first detection information generation module 220, a depth information determination module 230, a second detection information generation module 240, a calibration parameter determination module 250 and an adjustment parameter determination module 260.

Generally, the word "module" as used herein, refers to logic embodied in hardware or firmware, or to a collection of software instructions. The modules described herein may be implemented as software and/or hardware modules and may be stored in any type of non-transitory computer-readable medium or other storage device. In some embodiments, a software module may be compiled and linked into an executable program. It will be appreciated that software modules can be callable from other modules or from themselves, and/or can be invoked in response to detected events or interrupts. Software modules configured for execution on computing devices (e.g., processor 121) can be provided on a computer readable medium, such as a compact disc, a digital video disc, a flash drive, a magnetic disc, or any other tangible medium, or as a digital download (and can be originally stored in a compressed or installable format that requires installation, decompression, or decryption prior to execution). Such software code can be stored, partially or fully, on a memory device of the executing computing device, for execution by the computing device. Software instructions can be embedded in a firmware, such as an EPROM. It will be further appreciated that hardware modules can be included of connected logic units, such as gates and flip-flops, and/or can be included of programmable units, such as programmable gate arrays or processors. The modules or computing device functionality described herein are preferably implemented as software modules, but can be represented in hardware or firmware. In general, the modules described herein refer to logical modules that can be combined with other modules or divided into sub-modules despite their physical organization or storage.

In some embodiments, image acquisition module 210 may be configured to acquire one or more images captured by one or more cameras of camera 110 via network 130. In some embodiments, image acquisition module 210 may also be configured to control the one or more cameras of camera 110 so that an object may appear in view of at least two of the one or more cameras of camera 110. In some embodiments, image acquisition module 210 may transmit the one or more images to other module(s) of computing device 120 for further processing. For example, image acquisition module 210 may transmit the one or more images to first detection information generation module 220 for generating first detection information. Image acquisition module 210 may also transmit the one or more images to depth information determination module 230 for determining depth information. Image acquisition module 210 may further transmit the one or more images to calibration parameter determination module 250 for determining one or more calibration parameters.

In some embodiments, first detection information generation module 220 may be configured to generate a first detection information according to at least one of images acquired by image acquisition module 210. In some embodiments, the first detection information may include information relating to a color of, a shape of, a position of, and a size of an object (or a portion thereof), or the like, or any combination thereof. In some embodiments, the object may be any target of interest, such as a vehicle, a face, a person, etc. In some embodiments, first detection information generation module 220 may transmit a first detection information to other module(s) in computing device 120 for further processing. For example, first detection information generation module 220 may transmit the first detection information to second detection information generation module 240 for generating second detection information.

In some embodiments, first detection information generation module 220 may further include a training model generation unit 222 and a first detection information determination unit 226. Training model generation unit 222 may be configured to generate one or more training models that are used to generate a first detection information. In some embodiments, the training model may include a part-base model, a Gaussian model, and a Hidden Markov model (HMM), or the like, or any combination thereof. In some embodiments, a training model may be generated based on one or more samples, a root filter and a part filter. First detection information determination unit 226 may be configured to determine a first detection information according to the training model and at least one of the images acquired by image acquisition module 210.

In some embodiments, depth information determination module 230 may be configured to determine depth information of the at least one of the images acquired by image acquisition module 210. In some embodiments, the depth information of an image may include a distance between each pixel in the image and a camera capturing the image. The depth information may be represented by a depth map or a 3D point cloud. A value of a pixel in the depth map may represent a distance between the pixel in the image and the camera capturing the image. The 3D point cloud may be a set of 3D coordinates of pixels in the image.

In some embodiments, depth information determination module 233 may transmit the depth information to other modules in computing device 120 for further processing. For example, depth information determination module 230 may transmit the depth information to second detection information generation module 240 to generate second detection information.

In some embodiments, depth information determination module 230 may further include a first depth information determination unit 232 and a second depth information determination unit 236. First depth information determination unit 232 may be configured to determine a depth information of at least one of images captured by one or more cameras of camera 110 of which all lenses are fixed lenses. Second depth information determination unit 236 may be configured to determine the depth information of at least one of images captured by one or more cameras of camera 110 of which at least one of lenses is a rotatable lens. As used herein, a fixed lens refers to a lens non-rotatable along a first axis, a second axis or a third axis. The first axis, the second axis, and the third axis may be perpendicular to each other. For example, the one or more cameras of camera 110 may include a gun camera, and the gun camera may include a fixed lens. The rotatable lens may refer to a lens rotatable along a first axis, a second axis, or a third axis. For example, the one or more cameras of camera 110 may include a dome camera, and the dome camera may include a rotatable lens.

In some embodiments, second detection information generation module 240 may be configured to generate second detection information according to the first detection information and the depth information. In some embodiments, the second detection information may be modified first detection information. In some embodiments, a process of generating the second detection information may be a process to modify the first detection information. For example, if the first detection information is the information relating to the position of an object, the second detection information may be the information relating to the position of an object, but having higher accuracy than the first detection information.

In some embodiments, calibration parameter determination module 250 may be configured to determine a calibration parameter of camera 110. In some embodiments, the calibration parameter may include the parameter of the one or more cameras of camera 110 in an initial state. As used herein, the initial state is a state that the one or more cameras of camera 110 may be not in a process of capturing an image or transmitting an image. In some embodiment, the calibration parameter may be determined and used to construct a perspective projection model. For example, in a process of determining depth information of an image, the calibration parameter may be used to transform a 3D coordinate of a pixel in the image in a camera coordinate system into a 3D coordinate in a world coordinate system. As used herein, the world coordinate system is a coordinate system constructed according to the real world, and the origin of the world coordinate system is a point in the real world. The first coordinate axis and the second coordinate axis of the world coordinate system e parallel to a horizontal plane and perpendicular to each other. The third coordinate axis of the world coordinate system is perpendicular to the horizontal plane. The origin of the camera coordinate system of a camera is an optical center of the camera. The first coordinate axis of the camera coordinate system is an optical axis of the camera. The second coordinate axis of the camera coordinate system is an axis parallel to a horizontal plane and perpendicular to the first coordinate. The third coordinate axis of the camera coordinate system is an axis perpendicular to the horizontal plane.

In some embodiments, a calibration parameters may include an intrinsic parameter and/or an extrinsic parameter. The intrinsic parameter may be a parameter of the one or more cameras of camera 110 including, for example, a focal length, a central point and/or a lens distortion parameter, or a combination thereof. As used herein, the central point refers to a point of intersection of the optical axis and an imaging plane of the camera. The extrinsic parameter may be a pose and/or a position parameter of the one or more cameras of camera 110 including, for example, a pitch angle, a roll angle, a yaw angle, a height and/or a 3D coordinate of the origin of the camera coordinate system in the world coordinate system of the one or more cameras of camera 110, or a combination thereof. As used herein, the pitch angle refers to a rotation angle along the horizontal axis; the yaw angle refers to a rotation angle along the vertical axis; the roll angle refers to a rotation angle along an axis perpendicular to a plane of the vertical axis and the horizontal axis.

In some embodiments, calibration parameter determination module 250 may transmit a determined calibration parameter to other component(s) in computing device 120 for further processing. For example, calibration parameter determination module 250 may transmit the calibration parameter to depth information determination module 230 for determining depth information. As another example, calibration parameter determination module 250 may transmit the calibration parameter to first detection information generation module 220 for determining a first detection information.

In some embodiments, adjustment parameter determination module 260 may be configured to determine one or more adjustment parameters of at least one of the one or more cameras of camera 110. The adjustment parameter may be determined and used to determine depth information of the image captured by the one or more cameras of camera 110 of which at least one of lenses are rotatable lenses. In some embodiments, the adjustment parameter may include a focal length, a pitch angle, or a yaw angle of at least one camera with a rotatable lens of the one or more cameras of camera 110 when an object appears in view of at least two of the one or more cameras of camera 110. For example, when an object is in view of a first camera of the one or more cameras of camera 110, image acquisition module 210 may determine an adjustment parameter with which the object can appear in the view of a second camera of the one or more cameras of camera 110. The second camera may be controlled according to the adjustment parameter such that the object can appear in the view of the second camera. In some embodiments, adjustment parameter determination module 260 may transmit the adjustment parameter to other component(s) in computing device 120 for further processing. For example, adjustment parameter determination module 260 may transmit the adjustment parameter to depth information determination module 230 for determining depth information.

It should be noted that the above description of computing device 120 is merely provided for the purposes of illustration and not intended to limit the scope of the present disclosure. For persons having ordinary skills in the art, multiple variations or modifications may be made under the teachings of the present disclosure. However, those variations and modifications do not depart from the scope of the present disclosure. For example, computing device 120 may further include a storage module (not shown in FIG. 2). The storage may be configured to store data generated during any process performed by any component of in computing device 120. As another example, each of components of computing device 120 may include a storage. Additionally or alternatively, the components of computing device 120 may share a common storage device.

Figure 3:
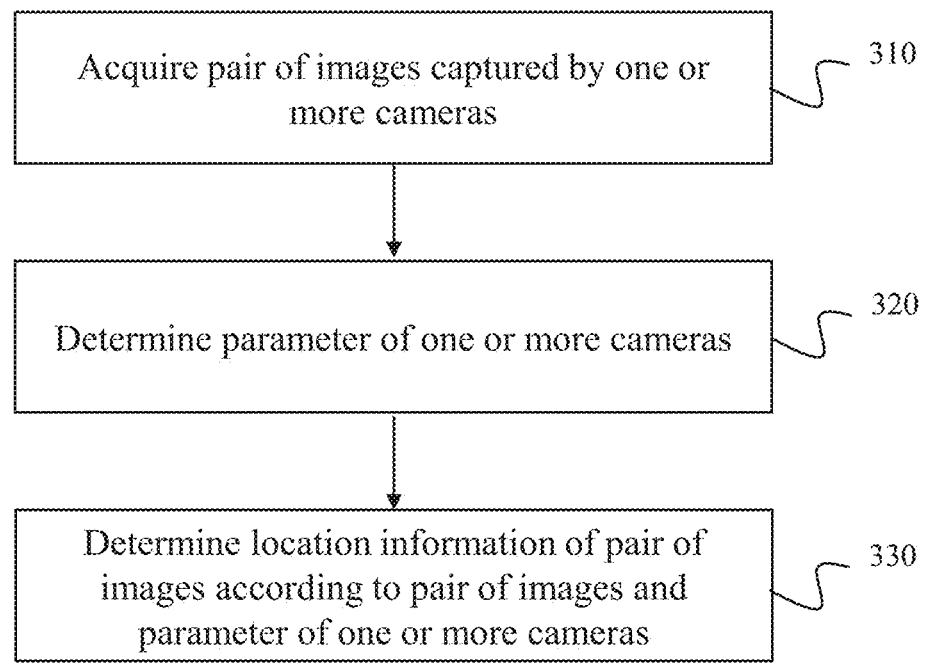
FIG. 3 is a flowchart illustrating an exemplary process of determining location information according to some embodiments of the present disclosure.

FIG. 3 is a flowchart illustrating an exemplary process of determining location information according to some embodiments of the present disclosure. In 310, a pair of images captured by one or more cameras of camera 110 may be acquired. Step 310 may be performed by image acquisition module 210. In some embodiments, the pair of images may be captured by two cameras of camera 110, by a camera with two lenses of camera 110, or by placing a camera at two different positions. In some embodiments, one image or more than one image may be acquired in 310. In some embodiments, all lenses of the one or more cameras may be fixed lenses. In some embodiments, the one or ore cameras of camera 110 may include at least one rotatable lens. In some embodiments, the pair of images captured by the one or ore cameras of camera 110 may be stored in memory 122.

In 320, a parameter of the one or more cameras of camera 110 may be determined. Step 320 may be performed by calibration parameter determination module 250, or adjustment parameter determination module 260, or a combination thereof. In some embodiments, the parameter may include a calibration parameter (e.g., an intrinsic parameter, and/or an extrinsic parameter), or an adjustment parameter (e.g., a focal length, a pitch angle, and/or a yaw angle). In some embodiments, a method of determining the one or more calibration parameters may include a method of using a calibration tool (e.g., a calibration board), a method of using a vanishing line and a vanishing point, or a method of using a relationship between a vertical coordinate and a parallax (as described in FIG. 11).

In 330, location information of the pair of images may be determined according to the pair of images and the parameter of the one or more cameras of camera 110. Step 330 may be performed by depth information determination module 230 or second detection information generation module 240. In some embodiments, the location information of the pair of images may include depth information or second detection information of the pair of images.

Figure 4:
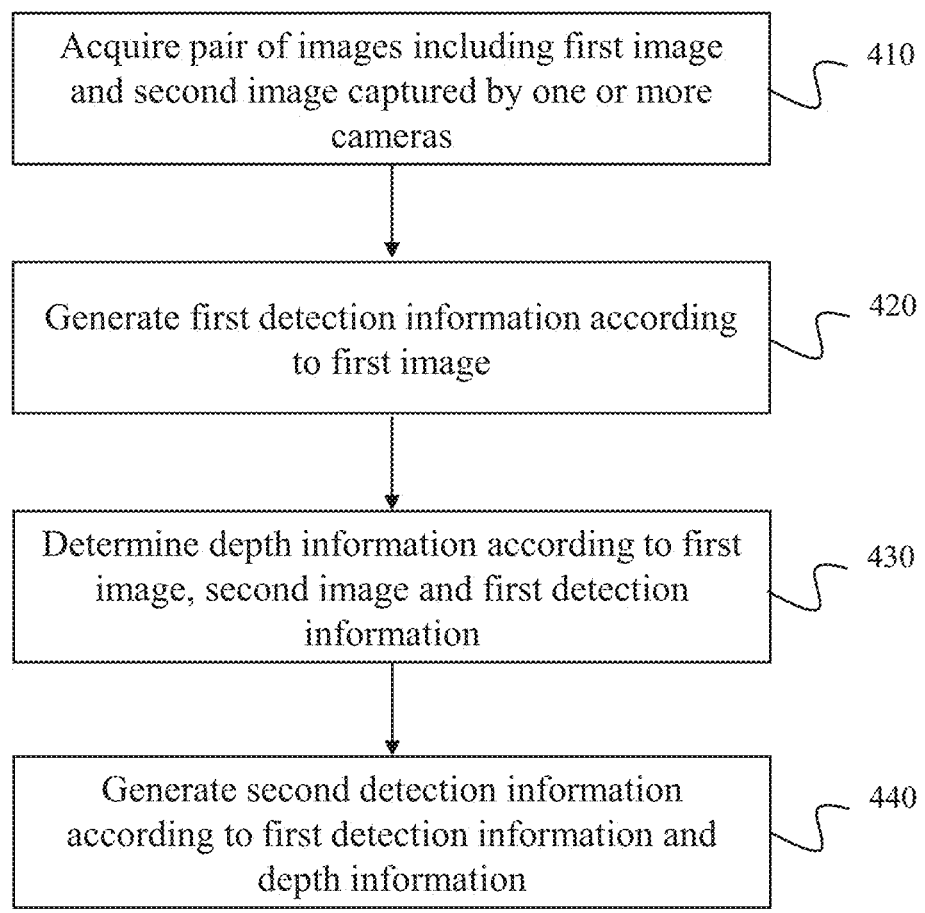
FIG. 4 is a flowchart illustrating an exemplary process of generating second detection information according to some embodiments of the present disclosure.

In some embodiments, step 330 of process 300 may be performed based on process 400 illustrated in FIG. 4 for generating second detection information. In 410, the pair of images including a first image and a second image captured by one or more cameras of camera 110 may be acquired. Step 410 may be performed by image acquisition module 210. In some embodiments, the first image and the second image may be captured by two cameras, by a camera with two lenses, or by placing a camera at two different positions. In some embodiments, all lenses of the one or more cameras of camera 110 may be fixed lenses. In some embodiments, the one or more cameras of camera 110 may include at least one rotatable lens. Merely by way of example, an exemplary pair of images including the first image and the second image is illustrated in FIGS. 12-A and 12-B.

In 420, first detection information may be generated according to the first image. Step 420 may be performed by first detection information generation module 220. In some embodiments, a method of generating the first detection information may include a method based on color information, a method based on marginal information, a method based on a training model, a method based on frame difference, a method based on background difference, or the like, or any combination thereof. In some embodiments, the training model may include a part-base model, a Gaussian model, a Hidden Markov model (HMM), or the like, or any combination thereof.

In 430, depth information of at least one of the pair of images may be determined according to the first image, the second image, and the first detection information. Step 430 may be performed by depth information determination module 230. In some embodiments, depth information of part of the image rather than the whole image may be determined. For example, in 420, an area in the first image may be determined as the first detection information representing position of an object in the first image. In 430, depth information of the area rather than the whole first image may be determined.

In 440, second detection information may be generated according to the first detection information and the depth information. Step 440 may be performed by second detection information generation module 240. In some embodiments, the second detection information may be the modified first detection information. In some embodiments, a process of generating the second detection information may be a process to modify the first detection information. For example, if the first detection information is the location information of an object, the second detection information may be more accurate location information compared to the first detection information.

For further understanding the disclosure, an example of generating the second detection information is described below. The example, however, is merely provided for the purposes of illustration and not intended to limit the scope of the present disclosure. In some embodiments, the first detection information may be an area representing the position of an object in the first image. The 3D coordinates of pixels in the area may be determined in 430. The purpose of generating the second detection information may be to remove pixels that are not belong to the object from the area.

In some embodiments, the process for removing pixels that do not belong to the object from the area may include one or more of the following operations. In a removing operation, pixels belonging to the ground may be removed. For example, the pixels with an absolute value of a coordinate of Y axis less than a first threshold may be removed. As used herein, the Y axis is an axis perpendicular to a horizontal plane. In another removing operation, noise pixels may be removed. For example, along the X axis or the Z axis, pixels may be divided into a plurality of groups of pixels of which the length is equal. As used herein, the X axis and the Z axis are perpendicular to the Y axis. For instance, a group of pixels may be a bin, which is denoted by $B_k$, the number of the groups is denoted by M, and the length is denoted by $\Delta S$. For a group of pixels, if the number of the pixels in the group is larger than a second threshold and the ratio of the number of the pixels in the group and the total number of the pixels is larger than a third threshold, the group may be considered as having no noise pixels. The above removing operation may be described through Equation (1) below:

$$\{\dot{B}_k\} = \{B_k | (n_k > th_2, n_k N > th_3)\}. \quad \text{Equation (1)}$$

wherein $\{\dot{B}_k\}$ refers to the set of groups without noise pixels, $B_k$ refers to the group, $n_k$ refers to the number of pixels in a group, $th_2$ refers to the second threshold, N refers to the total number of pixels, $th_3$ refers to the third threshold, and k is in the range from 0 to the number of the groups (e.g., M).

In a second detection information determining operation, second detection information may be determined based on a threshold method. The second detection information may be denoted by $\{\ddot{B}_k\}$. In some embodiment, a default group may be definition as a group of a part-base training model. In the second detection information determining operation, a minimum distance between a group in the set of groups having no noise pixels and the default group of pixels may be determined. As used herein, the minimum distance refers to a minimum value of the distance along the X axis or the Z axis between each pixel in the group in the set of groups without noise pixels and each pixel in the default group. If the minimum distance is less than a fourth threshold, the group may be regarded as the group belong to $\{\ddot{B}_k\}$.

It should be noted that the above description of generating the second detection information is merely provided for the purposes of illustration and not intended to limit the scope of the present disclosure. For persons having ordinary skills in the art, multiple variations or modifications may be made under the teachings of the present disclosure. However, those variations and modifications do not depart from the scope of the present disclosure. For example, in 410, more than two images may be acquired.

Figure 5:
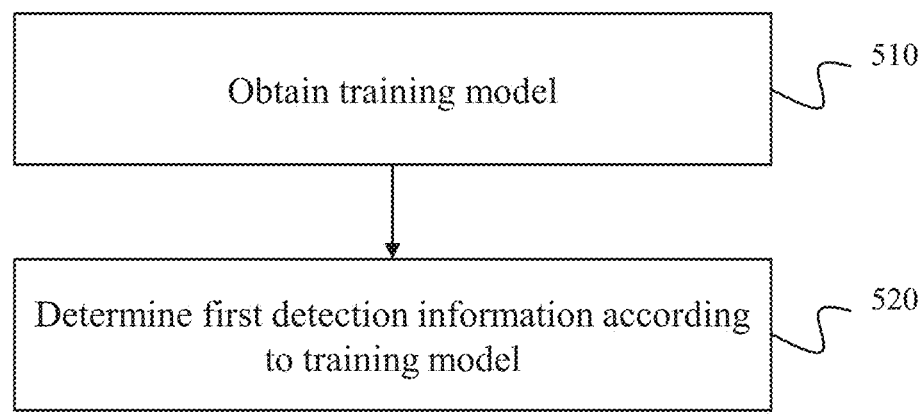
FIG. 5 is a flowchart illustrating an exemplary process of generating first detection information according to some embodiments of the present disclosure.

In some embodiments, step 420 of process 400 may be performed based on process 500 illustrated in FIG. 5 for generating first detection information Process 500 of generating the first detection information may be performed by first detection information generation module 220. In 510, one or more training models may be obtained. Step 510 may be performed by training model generation unit 222. In some embodiments, the training model may include a part-base model, a Gaussian model, a Hidden Markov model (HMM), or the like, or any combination thereof. In some embodiments, the training model may be obtained from a memory (e.g., memory 122, or a storage unit in first detection information generation module 220). In some embodiments, the training model may be obtained through a training process in real time. In 520, the first detection information may be determined according to the one or more training models. Step 520 may be performed by first detection information determination unit 226.

In some embodiments, step 510 of process 500 may be performed based on process 500 illustrated in FIG. 4 for obtaining a part-base training model. The process of obtaining the part-base training model may be performed by the training model obtaining unit 222. In 610, a plurality of samples including positive samples and negative samples may be obtained. The positive samples may be images including a target object (e.g., a car, a person, or a building). The negative samples may be images not including a target object (e.g., a car, a person, or a building). For example, if the target object is a car, the positive samples may be a plurality of images containing one or more cars. The negative samples may be a plurality of images that do not contain any car. In some embodiments, a number of the positive samples may be larger than that of the negative samples. For example, the number of the positive samples may be 2000. The number of the negative samples may be 1000.

In 620, an initial root filter may be generated according to the plurality of samples. The initial root filter may be trained by using an SVM (Support Vector Machines) with no latent variables. In machine learning, SVM may be supervised learning models with associated learning algorithms that analyze data used for classification and regression analysis. As used herein, the latent variables refer to a part location and an exact location of a root filter for a positive example. In some embodiments, the positive example may be constructed from the positive samples. The negative example may be constructed from the negative samples.

In 630, an updating root filter may be generated according to the initial root filter. Given the initial root filter generated in 620, for each bounding box, a best-scoring placement for the filter that significantly overlaps with the bounding box may be determined by using original, un-scaled images. As used herein, the bounding box refers to a rectangular area that represents position information of an object. The initial root filter may be retrained with a new positive example and an original random negative example, iterating twice, then the updating root filter may be generated In 640, a part filter may be generated according to the updating root filter. In some embodiments, a process of generating the part filter may be a process of initializing one or more parts from the updating root filter generated in 630. For further understanding the disclosure, an example of generating the part filer may be described. However, the example is merely provided for the purposes of illustration and not intended to limit the scope of the present disclosure. In this case, six parts of the updating filter may be initialized. The process for initializing the six parts may include one or more operations. In a selection operation, an area such that six areas equals 80% of the area of the updating root filter may be selected. The area selected from the updating root filter may be a rectangular region and may have the most positive energy. In a zero out operation, weights in the area may be zeroed out. The selection operation and the zero out operation may be repeated until six parts are selected.

In 650, a training model may be generated according to the samples and the part filter. A process for generating the training model may include one or more operations. In an operation, a cache may be determined. In a next operation, a highest scoring placement may be selected in the cache as the positive example corresponding to the bounding box. In a next operation, a highest scoring placement may be selected in the negative samples as the negative example. In a next operation, negative examples may be added to the cache. In a next operation, a new model may be trained by running the SVM on the positive and negative examples, each labeled with part placements. The new model may be updated 10 times using the above operations. In each iteration, hard instances from the previous cache may be kept and new hard instances may be added. As used herein, the hard instance refers to a bounding box in the negative example during the process of detecting an object. Toward the final iterations, all hard instances may be included in the cache.

Figure 7:
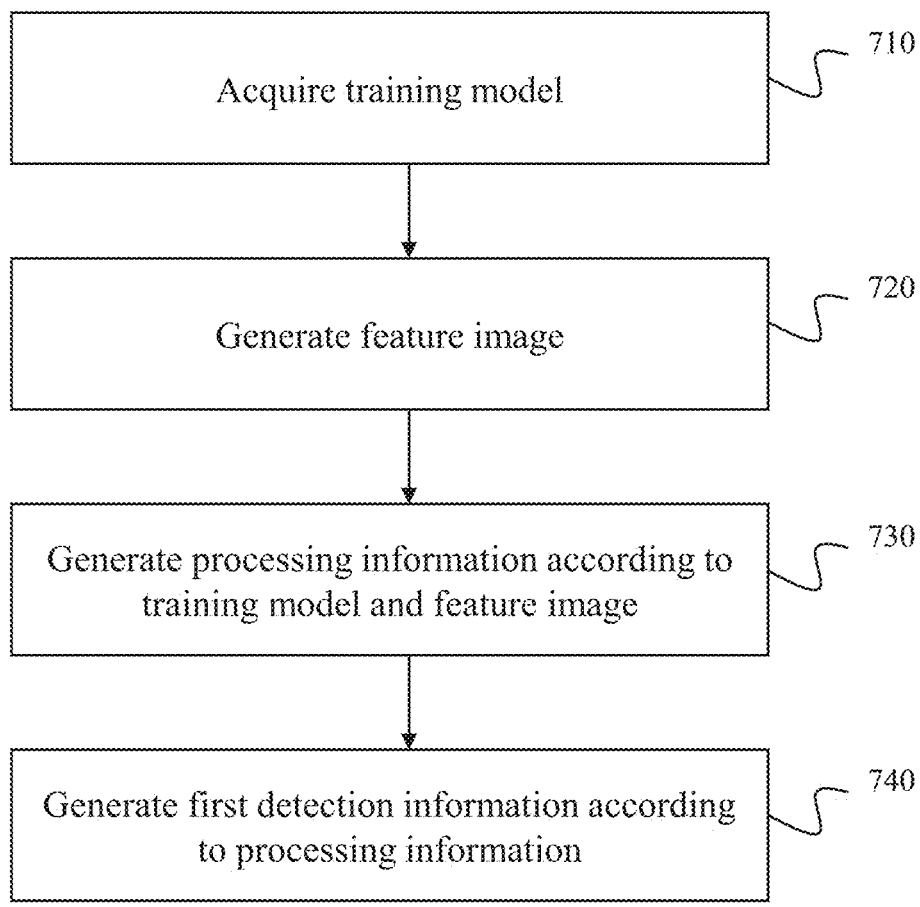
FIG. 7 is a flowchart illustrating an exemplary process of generating first detection information according to some embodiments of the present disclosure.

Back to FIG. 5, in some embodiments, step 520 of process 500 may be performed based on process 700 illustrated in FIG. 7 for generating first detection information. Process 700 of generating the first detection information may be performed by first detection information determination unit 226. For further understanding the disclosure, an example of generating the first detection information according to a part-base model may be described. The example, however, merely provided for the purposes of illustration and not intended to limit the scope of the present disclosure. A method of cascaded detecting may be performed to generate the first detection information.

Figure 6:
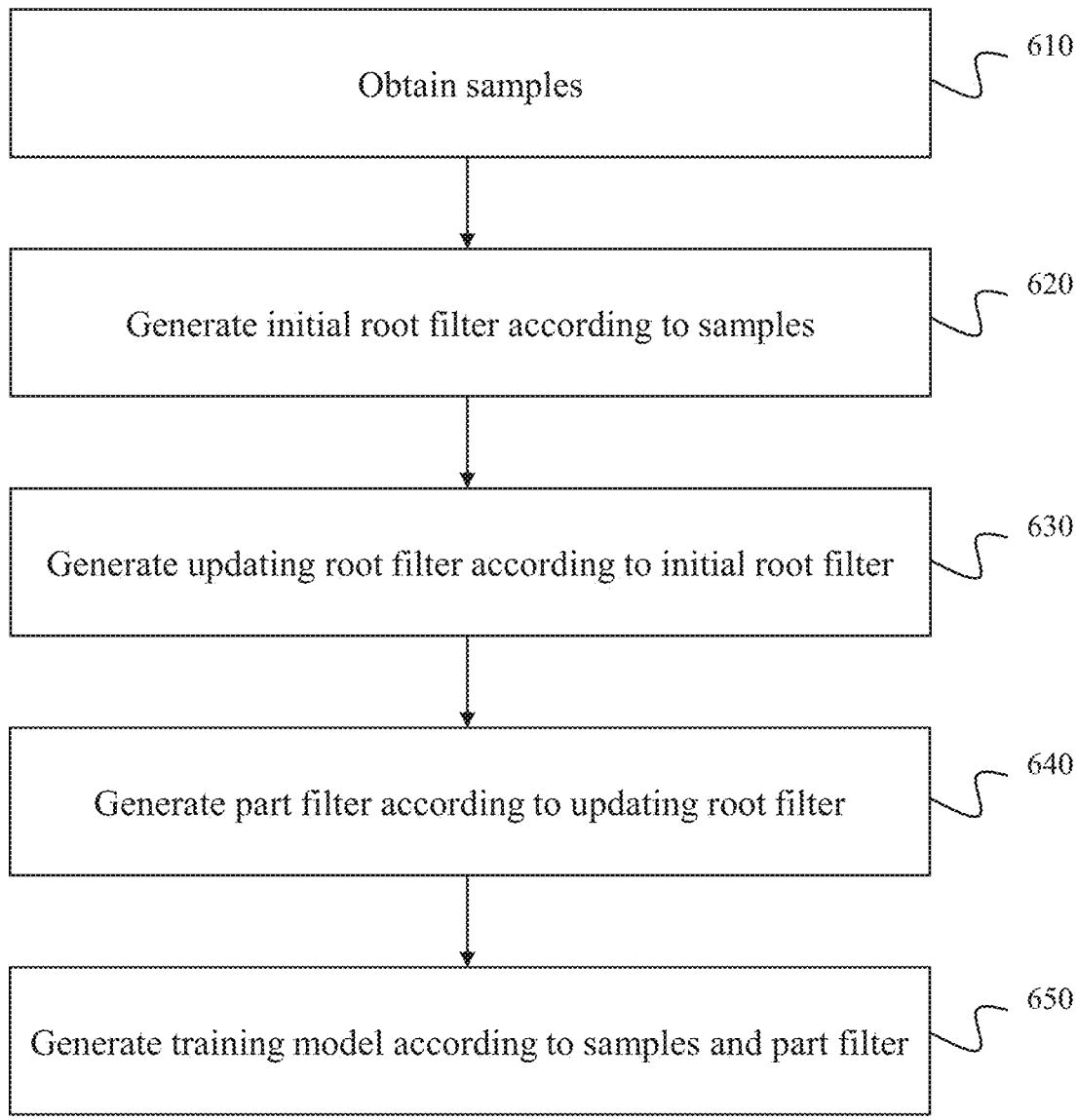
FIG. 6 is a flowchart illustrating an exemplary process of obtaining a part-base training model according to some embodiments of the present disclosure.

In 710, a training model may be acquired. In some embodiments, the training model may be obtained from a memory (e.g., memory 122, or a storage unit in first detection information generation module 220). In some embodiments, the training model may be obtained through a training process (e.g., the process described in FIG. 6) in real time.

In 720, a feature image may be generated. In some embodiments, the feature image may be a Histogram of Oriented Gradient (HOG) feature image. In the feature image, each pixel may include a 32-dimensional vector that may be referred to as a HOG feature. In some embodiments, the HOG feature may be represented at two different scales. Coarse features may be captured by a rigid template covering an entire detection window. Finer scale features may be captured by part templates that may be moved with respect to the detection window.

In 730, processing information may be generated according to the feature image and the training model. As used herein, processing information refers to an area that is related to position of an object may be determined in an image. In some embodiments, the feature image may be a HOG feature image. In some embodiments, a method of dynamic programming may be performed to generate the processing information. The process of generating the processing information may include the following operations. A response value of each part of the object in the feature image (e.g., the HOG feature image) may be determined. A part of the object that the response value may be larger than a fifth threshold may be determined and area that is related to the position of the object in the image may be determined.

In 740, first detection information may be generated according to the processing information. In some embodiments, an area determined in 730 may including some duplicate information. A method may be performed to remove the duplicate information so that the first detection information may be generated. In some embodiments, the method may be a method of non-maximum compress. In some embodiments, the first detection information generated in 740 may be an area referring to the position of the object in the image.

Figure 8:
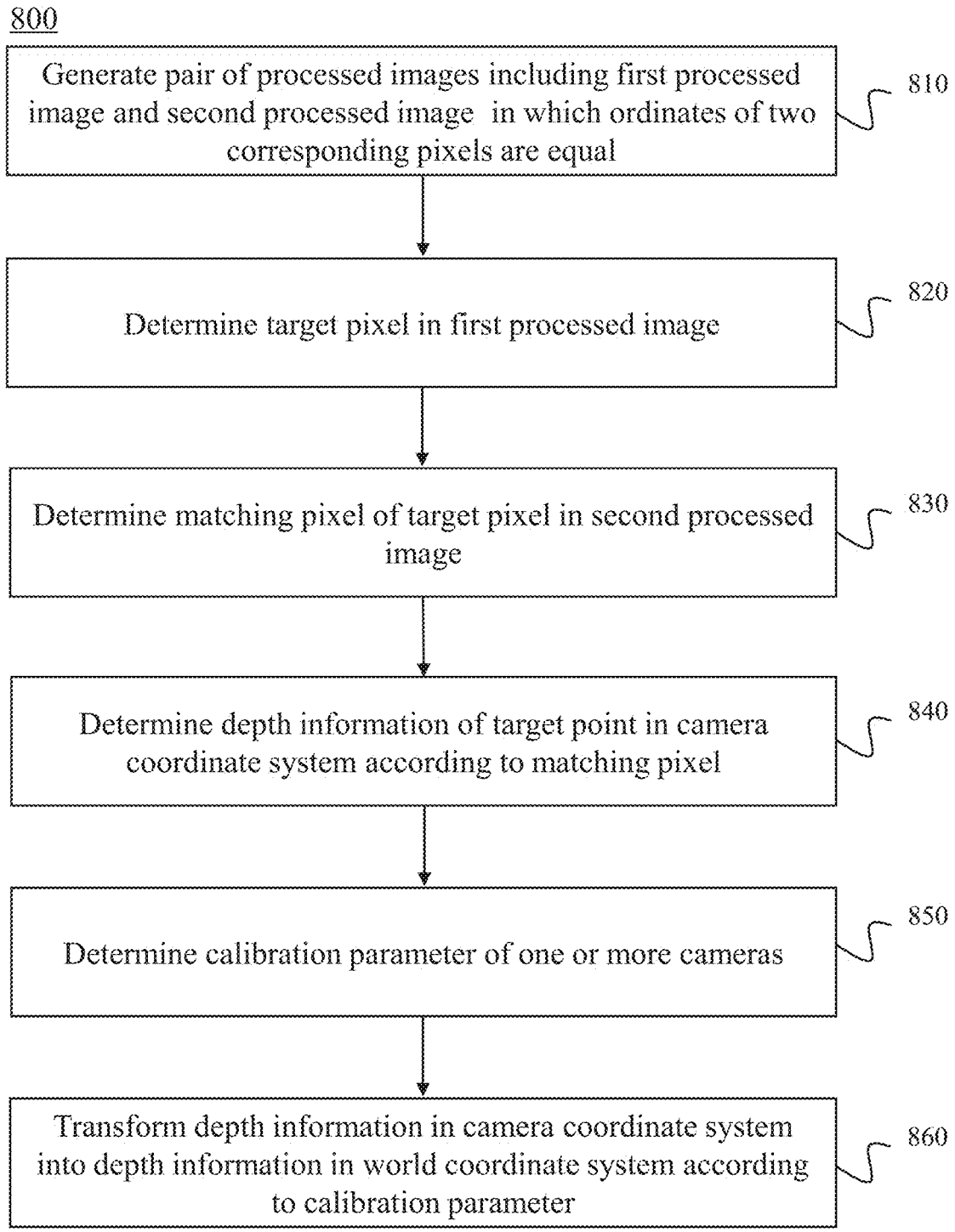
FIG. 8 is a flowchart illustrating an exemplary process of generating depth information according to some embodiments of the present disclosure.

Back to FIG. 4, in some embodiments, step 430 of process 400 may be performed based on process 800 illustrated in FIG. 8 for generating depth information. In 810, a pair of processed images including a first processed image and a second processed image in which vertical coordinates of two corresponding pixels in an image coordinate system are equal may be generated according to the pair of images. The pair of images may be captured by the one or more cameras of camera 110. In the image coordinate system, the origin may be a pixel in one of the pair of images (e.g., a pixel in the highest position in the top left corner of one of the pair of images). The horizontal coordinate axis of the image coordinate system may be a horizontal direction of the one of the pair of images. The vertical coordinate axis may be a vertical direction of the one of the pair of images. The two corresponding pixels in the pair of images may correspond to a same point in the real world. The process of step 810 may be realized by rectification. The purpose of rectification may be to make optical axes of the one or more cameras parallel and to make the vertical coordinates of the two corresponding points equal in the image coordinate system. For example, a coordinate of a first pixel in a first processed image may be referred to as $p_l(u_l,v_l)$ and a coordinate of a second pixel corresponding to the first pixel in a second processed image may be referred to as $p_r(u_r,v_r)$. The vertical coordinates of the first pixel and the second pixel in the pair of processed images may satisfy Equation (2) below:

$$v_l = v_r \qquad \text{Equation (2)}$$

In 820, a target pixel may be determined in the first processed image. In some embodiments, a coordinate of the target pixel may be referred to as p(u,v) In 830, a matching pixel of the target pixel may be determined in the second processed image. The method of determining the matching pixel may be a stereo matching method. For example, a difference between abscissas of the two corresponding pixels in the image coordinate system may be referred to as a parallax d. So the corresponding pixel of the target pixel in the second processed image of the target pixel may be referred to as p'(u+d,v). A matching cost may be defined as Equation (3) below:

$$c(u,v,d) = \sum_{j=v-W}^{v+W} \sum_{i=u-W}^{u+W} |p'(i+d,j) - p(i,j)|, \qquad \text{Equation (3)}$$

wherein W refers to the size of a matching window. In some embodiments, a superior matching pixel may be represented as $p_{m1}(u+d^*_1,v)$. $d^*_1$ may be defined as Equation (4) below:

$$d_1^* = \arg\min_d c(u, v, d), \qquad \text{Equation (4)}$$

wherein arg in refers to the arguments of the minima, which are the points of the domain of some function at which the function values are minimized. A secondary matching pixel may be determined in the same way as the superior matching pixel. The secondary matching pixel may be represented as $p_{m2}(u+d^*_2,v)$. If $c(u,v,d^*_1)/c(u,v,d^*_2) \le th_6$, the superior matching pixel may be accepted as the matching pixel, $th_6$ refers to a sixth threshold. In some embodiments, the value of $th_6$ may be 0.5-1. In some embodiments, the value of $th_6$ may be 0.9.

In 840, depth information of the target point in a camera coordinate system may be determined according to the matching pixel. In some embodiments, the origin of the camera coordinate system may be an optical center of one of the one or more cameras. The first coordinate axis of the camera coordinate system may be an optical axis of the one of the one or more cameras. The second coordinate axis of the camera coordinate system may be an axis parallel to a horizontal plane. The third coordinate axis of the camera coordinate system may be an axis perpendicular to the horizontal plane. For example, a parallax of sub pixel may be represented as ds. The central point may be represented as c($u_0$,$v_0$). As used herein, the central point refers to a point of intersection of the optical axis and an imaging plane of the camera capturing the first image. So the 3D coordinates in the camera coordinate system may be determined according to Equations (5)-(7) below:

$$x_{cp} = B(u-u_0)/d^s,\quad\text{Equation (5)}$$

$$y_{cp} = B(v-v_u)/d^s,\quad\text{Equation (6)}$$

$$z_{cp} = Bf/d^s,\quad\text{Equation (7)}$$

wherein $x_{cp}$, $y_{cp}$, $z_{cp}$ refer to the 3D coordinates of the target point in the camera coordinate system, and B refers to the baseline of the one or more cameras.

In 850, a calibration parameter of the one or more cameras may be determined. In some embodiment, the calibration parameter may be determined to construct a perspective projection model. For example, in a process of determining depth information of an image, the calibration parameter may be used to transform a 3D coordinate of a pixel in the image in a camera coordinate system into a 3D coordinate in a world coordinate system. In some embodiments, the calibration parameter may include an intrinsic parameter and/or an extrinsic parameter. The intrinsic parameter may be a parameter of the one or more cameras of camera 110 including, for example, a focal length, a central point and/or a lens distortion parameter, or a combination thereof. The extrinsic parameter may be a pose and a position parameter of the one or more cameras of camera 110 including, for example, a pitch angle, a roll angle, a yaw angle, a height, and/or a three dimensional coordinate of the origin of the camera coordinate system in the world coordinate system of the one or more cameras of camera 110, or a combination thereof. In some embodiments, a method of determining the calibration parameter may include a method of using a calibration tool (e.g., a calibration board), a method of using a vanishing line and a vanishing point, or a method of using a relationship between a vertical coordinate and a parallax (as describe in FIG. 11). In some embodiments, step 850 may be performed before step 810.

In 860, the depth information of the target pixel in the camera coordinate system may be transmitted into depth information of the target pixel in a world coordinate system according to the calibration parameter. For example, the 3D coordinates in the world coordinate system may be determined by using the pitch angle and the height of one of the one or more cameras according to Equations (8)-(10) below:

$$x_{wp} = x_{cp}\quad\text{Equation (8)}$$

$$y_{cp} = \cos\theta \times y_{cp} + \sin\theta \times z_{cp} - h_c,\quad\text{Equation (9)}$$

$$z_{cp} = -\sin\theta \times y_{cp} + \cos\theta \times z_{cp},\quad\text{Equation (10)}$$

wherein $\theta$ refers to the pitch angle, $h_c$ refers to the height of the one of the one or more cameras, and $x_{wp}$, $y_{wp}$, $z_{wp}$ refer to the 3D coordinates of the target point in the world coordinate system.

In some embodiments, step 850 may be performed by calibration parameter determination module 250. Other steps in FIG. 8 may be performed by first depth information determination unit 232. In some embodiments, the one or more cameras capturing the pair of images used in the process in FIG. 8 may be cameras of which all lenses are fixed lenses.

In some embodiments, process 800 of determining depth information in FIG. 8 may be used in step 430 of process 400. For example, the purpose of step 430 in FIG. 4 may be to determine depth information of the first detection information. So when the process of determining depth information in FIG. 8 is used in step 430 of process 400, the target point may be selected according to the first detection information. For example, if the first detection information is location information of an object and the location information is represented by an area in the first image of the pair of images, the purpose of step 430 of process 400 may be to determine depth information of the area and the target point may be selected in the area.

Figure 9:
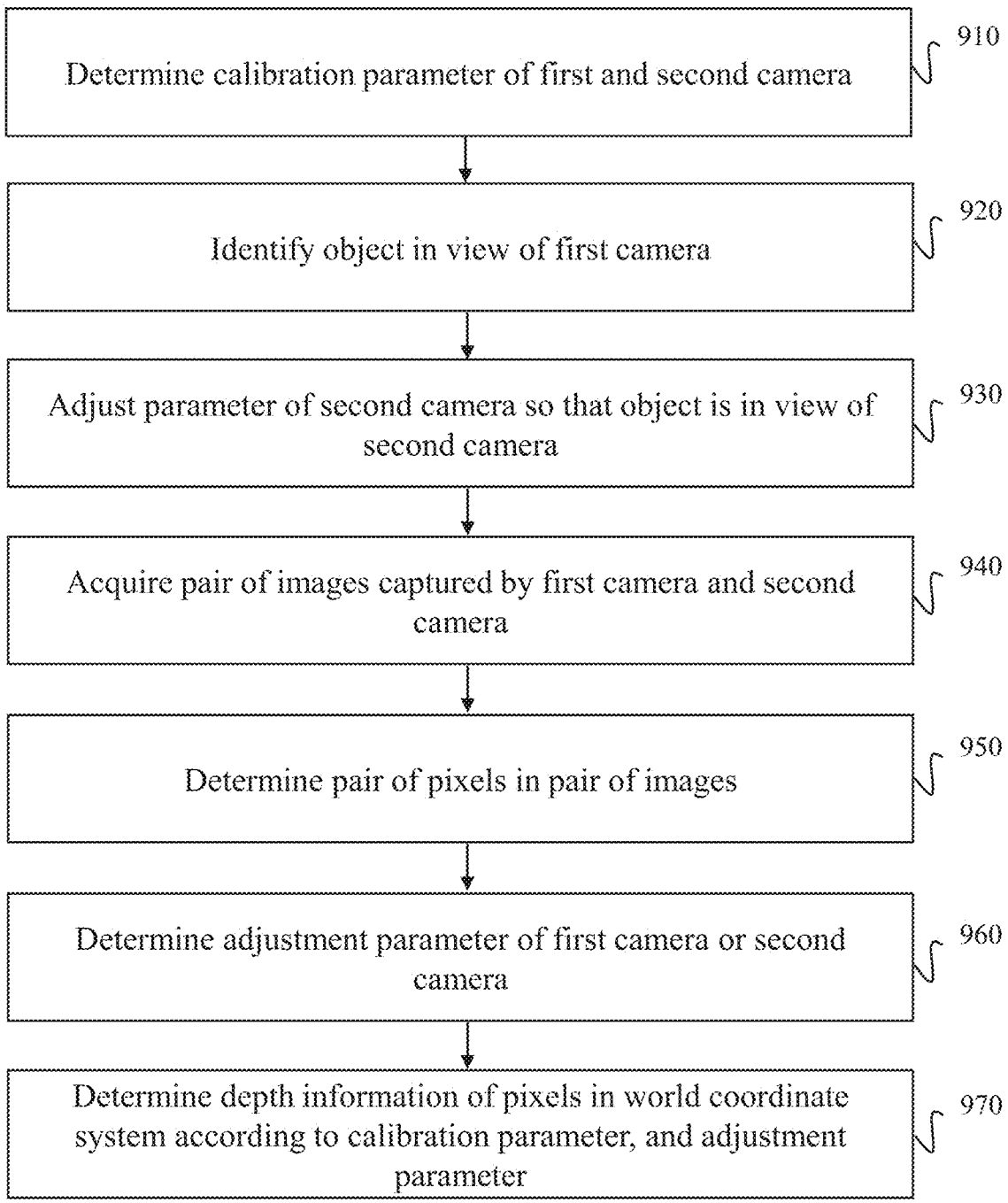
FIG. 9 is a flowchart illustrating an exemplary process of generating depth information according to some embodiments of the present disclosure.

FIG. 9 is a flowchart illustrating an exemplary process 900 of generating depth information according to some embodiments of the present disclosure. In some embodiments, process 900 may be used for generating location information in 330 of process 300. In some embodiments, process 900 may be used for generating depth information in 430 of process 400.

In 910, a calibration parameter of a first camera and a second camera of the one or more cameras of camera 110. In some embodiments, the one or more cameras of camera 110 may include one fixed lens and one rotatable lens. Alternatively, the one or more cameras of camera 110 may include one fixed lens and two or more rotatable lenses. Alternatively, the one or more cameras of camera 110 may include two or more fixed lenses and one rotatable lens. Alternatively, the one or more cameras of camera 110 may include two or more fixed lenses and two or more rotatable lenses. In some embodiments, the first camera may be a camera of which lenses are all fixed lenses. Alternatively, the first camera may be a camera with at least one rotatable lens. Further, in some embodiments, if the one or more cameras of camera 110 include one fixed lens and one rotatable lens, or include more than one fixed lenses and one rotatable lens, the first camera may be the camera of which lenses are all fixed lenses. In some embodiments, if the one or more cameras of camera 110 include one fixed lens and more than one rotatable lenses, or include more than one fixed lenses and more than one rotatable lenses, the first camera may be the camera with at least one rotatable lens, or the camera of which lenses are all fixed lenses. In some embodiments, the second camera may have at least one rotatable lens.

In some embodiments, for a camera with at least one rotatable, theoretically, the optical point of the camera and the point of intersection of the three rotatable axes along which the rotatable lens rotates may be coincident. However, because of some influence factors, such as a mechanical error, or a position error, the optical point of the camera and the point of intersection of the three rotatable axes along which the rotatable lens rotates are in practice not coincident. The difference in this condition may be compensated by using one or more matrixes. For example, if the optical axis of the camera is not perpendicular to the two of the rotatable axes, a rotatable matrix may be applied. As anther example, if the optical axis of the camera is perpendicular to the two of the rotatable axes, but the optical point of the camera and the point of intersection of the three axes are not coincident, a translation matrix may be applied. In this disclosure, the optical point of the camera and the point of intersection of the three rotatable axes along which the rotatable lens rotates may be considered as coincident.

In some embodiments, a method of determining the calibration parameter may include one or more operations. In some embodiments, for determining the calibration parameter, the first camera and the second camera may first be set to be in an initial state. As used herein, the initial state is a state that the pitch angle, the roll angle and the yaw angle of the rotatable lens(es) in camera 110 are 0. A camera coordinate system of any one of the first camera and the second camera may further be set as a world coordinate system. The calibration parameter of the first camera and the second camera may then be determined according to the world coordinate system. In addition, a camera coordinate system of any one of the first camera and the second camera may be set as a world coordinate system. In some embodiment, the calibration parameter may include an intrinsic parameter and/or an extrinsic parameter. In some embodiments, the intrinsic parameter may be a parameter of the camera including, for example, a focal length, a central point, and/or a lens distortion parameter, or a combination thereof. The extrinsic parameter may be a pose and a position parameter of the camera including, for example, a pitch angle, a roll angle, a yaw angle, a height, and/or a 3D coordinate of the origin of a camera coordinate system in a world coordinate system of the one or more cameras of camera 110, or a combination thereof. For example, if the first camera and the second camera are cameras with at least one rotatable lens, in an operation, the first camera and the second camera may be set to be in the initial state. For instance, the pitch angle, the yaw angle and the roll angle of the two cameras may be set to zero so that the two cameras may be in the initial state. In a next operation, the camera coordinate system of one of the two cameras may be regarded as the world coordinate system. For instance, the origin of the camera coordinate system of the first camera may be referred to as $C_l$, and the origin of the world coordinate system may be referred to as $O_w$. If the camera coordinate system of the first camera is regarded as the world coordinate system, $C_l$ and $O_w$ may be identical. In this condition, the origin of the camera coordinate system of the second camera may be $C_r$ according to the camera coordinate system of the first camera.

The method of determining the calibration parameter may include a method of using a calibration tool (e.g., a calibration board), a method of using a vanishing line and a vanishing point, or a method of using a relationship between a vertical coordinate and a parallax (which will be explained in connection with FIG. 11 below).

In 920, an object may be identified in view of a first camera of the one or more cameras of camera 110. In some embodiments, the object may be any target of interest, such as a vehicle, a face, a person, etc.

In 930, a parameter of a second camera may be adjusted so that the object is in view of the second camera. In some embodiments, the parameter of the second camera may be adjusted so that the object is in a central position in the view of the second camera. In some embodiments, the parameter of the second camera may include a pitch angle, a yaw angle, or a focal length of the second camera. In some embodiments, the second camera may be the camera with at least one rotatable lens. In some embodiments, the pitch angle and the yaw angle of the second camera may be adjusted so that the object is in the view of the second camera. In some embodiments, the focal length of the second camera may be adjusted so that a resolution ratio of the object in the second camera is higher than a first default resolution ratio. In some embodiments, a focal length of the first camera may be adjusted so that a resolution ratio of the object in the first camera is higher than a second default resolution ratio. In some embodiments, the process of adjusting the focal length of the first camera may be performed in 920, or in 930 while the focal length of the second camera is adjusted. In some embodiments, the first default resolution ratio and the second default resolution ratio may be different in different conditions. The first default resolution ratio and the second default resolution ratio may be affected by many factors, such as the object, the environment in which the object is, algorithm for adjusting the focal length, or a combination thereof.

In 940, a pair of images captured by the first camera and the second camera may be acquired. In some embodiments, a process may be performed to determine whether the object that the first camera and the second camera captured are identical according to the pair of images. For example, an area of the object in the pair of images and one or more feature points in the area of the object may be determined. In some embodiments, the feature point may be a point according to an algorithm (e.g., SIFT (Scale-Invariant Feature Transform), SURF (Speeded Up Robust Features), Harris), or a specific point (e.g., a license plate, an eye). In some embodiments, a first similarity of the area of the object in the pair of images may be determined and a second similarity of the one or more feature points in the area of the object may be determined. If the similarity of any area in the pair of images is equal to or larger than a seventh threshold, and the similarity of any feature point is equal to or larger than an eighth threshold, the first camera and the second camera may capture the identical object. If not, step 930 may be performed again.

In 950, if the first camera and the second camera capture the identical object, a pair of pixels may be determined in the pair of images captured by the first camera and the second camera. In some embodiments, the pair of pixels may include a first pixel and a second pixel. The first pixel may be in the image captured by the first camera, and the second pixel may be a corresponding pixel of the first pixel in the image captured by the second camera. The two corresponding pixel may correspond to a same point in the real world.

In 960, an adjustment parameter of the first camera or the second camera may be determined. In some embodiments, for a camera with at least one rotatable lens, compared to the parameter in the initial state, the parameter after adjusting may be referred to as the adjustment parameter of the camera. In some embodiments, if the first camera is the camera of which all lenses are fixed lenses, only the parameter of the second camera may be determined. In some embodiments, if the first camera has at least one rotatable lens, the parameter of the first camera and the second camera may be determined. In some embodiments, the adjustment parameter may include an adjustment pitch angle, an adjustment yaw angle, and/or an adjustment focal length.

In 970, depth information of the pair of pixels in a world coordinate system may be determined according to the calibration parameter and the adjustment parameter. In some embodiments, as illustrated in FIG. 10-A, for a camera, a point in the real world may be referred as to P. The coordinate of P in the world coordinate system may be referred to as P(x,y,z). The pixel of P in the image captured by the camera may be referred to as p. The coordinates of p in the image coordinate system may be referred to as p(u,v). The origin of the camera coordinate system may be referred to as C. The central point of the image may be referred to as c, and its coordinate in the image coordinate system may be referred to as c ($u_0,v_0$). As used herein, the central point refers to a point of intersection of the optical axis CZ of the camera and the imaging plane. The direction vector from the origin of the camera coordinate system to P may be referred to as $\vec{d}$. $\vec{d}$ may be determined by Equation (11) below:

$$\ddot{d}\vec{Cp}=(u-u_0,v-v_0,\ddot{f}),\quad\quad\quad\text{Equation (11)}$$

wherein $\ddot{f}$ is referred to as the adjustment focal length of the camera.

During the process of determining depth information, the pair of pixel in the pair of images may be referred to as $p_l$ and $p_r$, and the coordinates of $p_l$ and $p_r$ in the image coordinate system may be referred to as $p_l$ $(u_l,v_l)$ and $p_r(u_r,v_r)$. The coordinates in the image coordinate system of central points of the image captured by the first camera and the image captured by the second camera may be referred to as $c_{0l}(u_{0l},v_{0l})$ and $c_{0r}(u_{0r},v_{0r})$, respectively. The adjustment focal length of the first camera and the second camera may be referred to as $\ddot{f}_l$ and $\ddot{f}_r$, respectively. The direction vectors from the origin of the camera coordinate system to the pixel may be referred to as $\ddot{d}_l$ and $\ddot{d}_r$, respectively. $\ddot{d}_l$ and $\ddot{d}_r$ may be determined by Equation (12) and Equation (13) below:

$$\ddot{d}_l=\overrightarrow{C_l p_l}=(u_l-u_{0l},v_l-v_{0l},\ddot{f}_l),\quad\quad\quad\text{Equation (12)}$$

$$\ddot{d}_r=\overrightarrow{C_r p_r}=(u_r-u_{0r},v_r-v_{0r},\ddot{f}_r),\quad\quad\quad\text{Equation (13)}$$

$\ddot{d}_l$ and $\ddot{d}_r$ may be transformed into the direction vector in the camera coordinate system in the initial state by using Equation (14) and Equation (15) below:

$$d_l=R'_l\cdot\ddot{d}_l,\quad\quad\quad\text{Equation (14)}$$

$$d_r=R'_r\cdot\ddot{d}_r,\quad\quad\quad\text{Equation (15)}$$

wherein $R'_l$ and $R'_r$ refers to inverse matrixes of rotation matrixes of the first camera and the second camera. The rotation matrix may be represented by Equation (16) below:

$$R=\begin{bmatrix}1&0&0\\0&\cos\alpha&\sin\alpha\\0&-\sin\alpha&\cos\alpha\end{bmatrix}\begin{bmatrix}\cos\beta&0&\sin\beta\\0&1&0\\-\sin\beta&0&\cos\beta\end{bmatrix},\quad\quad\quad\text{Equation (16)}$$

wherein $\alpha$ refers to an adjustment yaw angle, and $\beta$ refers to an adjustment pitch angle.

In some embodiments, $d_l$ and $d_r$ may be transformed into the direction vector in the world coordinate system by using Equation (17) and Equation (18) below:

$$d'_l=R_{0l}d_l+T_{0l},\quad\quad\quad\text{Equation (17)}$$

$$d'_r=R_{0r}d_r+T_{0r},\quad\quad\quad\text{Equation (18)}$$

wherein $R_{0l}$ and $R_{0r}$ refer to a rotation matrix in the initial state of the first camera and the second camera, and $T_{0l}$ and $T_{0r}$ refer to the 3D coordinates of the origins of the camera coordinate system of the first camera and the second camera in the world coordinate system.

In some embodiments, the 3D coordinate of P may be determined according to a triangular relationship illustrated in FIG. 10-B. For example, the origins of the camera coordinate system of the first camera and the second camera may be $C_l$ and $C_r$, respectively. $C_l$, $C_r$, $d'_l$, $d'_r$, and P may form a triangle. The 3D coordinate of P may be determined according to the triangle.

In some embodiments, because of some influence factors, such as a mechanical error, a position error for determined the pair of pixels or a resolution ratio, $d'_l$ and $d'_r$ may not be in a plane. So a method may be performed so that $d'_l$ and $d'_r$ are in a plane. In some embodiments, one method may be to define P as a point that the sum of the first Euclidean distance between P and $d'_l$, and the second Euclidean distance between P and $d'_r$ are minimum. Another method may include the following operations. In an operation, $d'_l$ or $d'_r$ may be selected as a direction without an error. If $d'_l$ is selected as the direction without an error, a plane π may be determined according to $C_l$, $C_r$ and $d'_l$. In the following operation, $d'_l$ may be projected to the plane π along a normal direction of the plane π. The projection vector may be referred to as $d''_r$. So P may be the point of intersection of $d'_l$ and $d''_r$.

In some embodiments, the first camera and the second camera may be a same camera with two lenses.

In some embodiments, step 910 may be performed by calibration parameter determination module 250. Step 960 may be performed by adjustment parameter determination module 260. Other steps in FIG. 9 may be performed by second depth information determination unit 236.

In some embodiments, the process of determining depth information in FIG. 9 may be used in step 430 of process 4004. The purpose of step 430 in FIG. 4 may be to determine depth information of the first detection information. So when the process of determining depth information in FIG. 9 is used step 430 of process 400, the pair of pixels may be selected according to the first detection information. For example, if the first detection information is location information of an object and the location information is represented by an area in the first image of the pair of images, the purpose of step 430 of process 400 may be to determine depth information of the area and the pair of pixels may be selected in the area in the first image and the corresponding location in the second image.

Here are some examples provided for explain the application of the process described in FIG. 9.

In some embodiments, the one or more cameras in the process described in FIG. 9 may include a first camera and a second camera both of which have at least one rotatable lens. For example, the first camera and the second camera may be both ball cameras, and camera 110 may be a double ball camera system.

In an initial state of the double ball camera system, the rotate angle of both the ball camera may be set to a particular value (e.g., zero) to monitor a different area or a small overlap area. A calibration process may be performed as described in 910 to determine calibration parameters (e.g., intrinsic parameters and/or extrinsic parameters) of the first camera and the second camera of the double ball camera system. When an object of interest is identified in a view of a first camera, steps 930-970 may be performed to capture a pair of images of the object and determined depth information (e.g., a 3D coordinate $P_0$) of the object. The object may be described by using the 3D coordinate data, a color information and any other information related to the object. The process described in FIG. 9 of such a double ball camera system may be applied to capture a moving object. An average speed of the object may be determined according to Equation (19) below:

$$v=(P_t-P_0)/t,\quad\quad\quad\text{Equation (19)}$$

wherein t refers to a period of time, $P_0$ refers to a 3D coordinate at a first time, $P_t$ refers to a 3D coordinate after the period of time of t, and v refers to an average speed in the period of time of t.

The 3D coordinate and average speed data of an object may be used to analyze abnormal behavior of an object. For example, a suspect may run after committing a wrongdoing. A sequence of images of a moving man may be useful in recording features of the suspect.

In some embodiments, if the one or more cameras in the process described in FIG. 9 include a first camera of which all lenses are fixed lenses and a second camera with at least one rotatable lens, the process described in FIG. 9 may be applied to detect illegal parking by determining the 3D location of a vehicle. A tag may be set according to a vehicle license plate, classification of a vehicle (e.g., sport utility vehicle, truck, etc.), color information of a vehicle, and any other information related to the vehicle. A duration of illegal parking may be determined by determining a parking time and when the illegal parking vehicle leaves the location.

In some embodiments, if the one or more cameras in the process described in FIG. 9 include a plurality of cameras of which all lenses are fixed lenses and a plurality of cameras with at least one rotatable lens, the process described in FIG. 9 may be applied to track an object. For example in a multi-gun and multi-ball camera system, 3D coordinate and average speed data of an object may be determined. The 3D coordinate and average speed data may be used to determine whether the object has been screened. The 3D coordinate may not be effected by changing angle of view. Movement of portion (e.g., whirling, wearing a hat, putting on/peeling off clothes) may not lead to a sudden change of the 3D coordinate. In one embodiment, a moving trajectory of an object may be forecasted basing on the 3D coordinate data of a fast moving object.

FIG. 10-A is a schematic diagram of a direction vector of a point in the camera coordinate system according to some embodiments of the present disclosure. More detailed descriptions regarding the direction vector may be found in FIG. 9 (e.g., step 970), FIG. 10-B is a schematic diagram of a triangular relationship among origins of the camera coordinate system of the first camera and the second camera and a point in the real world according to some embodiments of the present disclosure. More detailed descriptions regarding the direction vector may be found in FIG. 9 (e.g., step 980).

FIG. 11 is a flowchart of an exemplary process of determining a height and an angle of one or more cameras according to some embodiments of the present disclosure. In some embodiments, process 1100 may be used for determining a calibration parameter in 850 of process 800, in 910 of process 900, and/or in 320 of process 300.

In 1110, process 1100 may acquire a pair of images including a first image and a second image captured by one or more cameras of camera 110. Step 1110 may be performed by image acquisition module 210. In one embodiment, the pair of images may be shown in FIGS. 12-A and 12-B.

In one embodiment, a pair of images is captured by a stereoscopic camera with parallel optical axes. A baseline of the stereoscopic camera may be parallel with a reference plane. The reference plane is in the view of the stereoscopic camera. In one embodiment, the reference plane may be a fixed plane in environment, such as a ground plane, a desktop plane, etc.

In 1120, process 1100 may generate a pair of processed images including a first processed image and a second processed image in which a vertical coordinates of two corresponding pixels (e.g., a first pixel and a second pixel) are equal according to pair of images. In one embodiment, a relationship of the vertical coordinates of the first pixel and the second pixel in the pair of processed images may satisfy Equation (2) as described above in connection with FIG. 8. Step 1120 may be performed by calibration parameter determination module 250.

In 1130, process 1100 may identify an area in a first processed image. The area of the first processed image may be corresponding to at least part of a reference plane. The area of the first processed image may be determined by a user or determined by computer device 120 (shown in FIG. 1). In one embodiment, the user may input an instruction through user device 140 (shown in FIG. 1) and select an area of the first processed image. For example, the user can select a rectangular zone for determining an area. Computer device 120 may receive the instruction from user device 140 and identify an area in the first processed image. For example, if the user select a rectangular zone in the first processed image through user device 140, computer device 120 may receive the instruction from user device 140 and identify the rectangular zone as the area in the first processed image. In one embodiment, the area of the first processed image may be determined by a computer with a pattern recognition algorithm, such as classification algorithms, clustering algorithms, ensemble learning algorithms, general algorithms for predicting arbitrarily-structured (sets of) labels, multilinear subspace learning algorithms, real-valued sequence labeling algorithms, regression algorithms, and sequence labeling algorithms. In one embodiment, the area of the first processed image may be determined as first detection information as described elsewhere in this disclosure in connection with FIGS. 5-7.

In 1140, process 1100 may determine a parallax between a first pixel in the area in the first processed image and second pixel corresponding to the first pixel in a second processed image. The first pixel in the area in the first processed image and second pixel corresponding to the first pixel in a second processed image may correspond to a same point in the real world. The parallax may be denoted by a difference of the abscissas of the first pixel in the area in the first processed image and second pixel corresponding to the first pixel in a second processed image. In one embodiment, the parallax may be denoted by d as Equation (20) below:

$$d = u_1 - u_2 \qquad \text{Equation (20)}$$

wherein $u_1$ refers to the abscissas of the first pixel in the area in the first processed image of a image coordinate, and $u_2$ refers to the abscissas of the second pixel in the area in the second processed image of a image coordinate.

In 1150, process 1100 may determine a relationship between a vertical coordinate of the first pixel in image coordinate and determined parallax. The relationship may be a linear relationship or a nonlinear relationship.

In one embodiment, the relationship of the vertical coordinate and determined parallax may satisfy Equation (21) below:

$$d = k^* v + b^* \qquad \text{Equation (21)}$$

wherein d refers to the determined parallax, v refers to the vertical coordinate of the first processed image and second pixel corresponding to the first pixel in a second processed image, and $k^*$ and $b^*$ refer to undetermined parameters.

In one embodiment, step 1150 may be performed by a space compression method. The space compression method may include the following operations. A matching cost $G_{UVD}$ of a pixel in a reference area may be determined. The value of $G_{UVD}$ denotes a matching cost of a pixel in the reference area in a second processed image with a parallax d, wherein d is an integer not less than zero. In a next operation, $G_{UVD}$ may be replace with $G_{VD}$. The value of $G_{VD}$ stands for an average matching cost of the pixels of which the parallax is d in a u direction in the second processed image. In one embodiment, the parallax of pixels of the reference area in a u direction in the second processed image may be consider to be equal. Replace the $G_{UVD}$ with $G_{VD}$ may modify computational speed. More detailed descriptions regarding $G_{VD}$ may be found elsewhere in this disclosure in connection with FIG. 13-A. In a next operation, a minimum value of matching cost in a row in the d direction of $G_{VD}$ may be determined. A straight-line fitting of the minimum values determined above may then be performed. In a next operation, a relationship between the vertical coordinate of the first processed image and second pixel corresponding to the first pixel in a second processed image, and determined parallax may be determined.

In some embodiments, the relationship of the vertical coordinate and parallax may be determined by a point-by-point stereo matching method of pixels corresponding to points in the reference area. Alternatively or additionally, the relationship of the vertical coordinate and parallax may be determined by a stereo matching method of pixels corresponding to characteristic points in the reference area. The characteristic points may be based on geometrical characteristic, such as edge elements, corners, line segments, curve segments, circles, ellipses and regions.

In 1160, process 1100 may determine a projection equation according to the determined relationship. The projection equation of the optical axis of which camera acquire the first processed image in the reference plane may be expressed as:

$$z = k_g y + b_g \quad \text{Equation (22)}$$

wherein $k_g$ and $b_g$ refer to undetermined parameters, z refers to y axis of a camera coordinate, and y refers to y axis of a camera coordinate.

In some embodiments, a trigonometry of three dimensional reconstruction may be used to determine the projection equation. According to the trigonometry of three dimensional reconstruction, a relationship of y axis of a camera coordinate, baseline B of the stereoscopic camera, parallax d, and vertical coordinate v may satisfy Equation (23) below:

$$y = \frac{B(v - v_0)}{d} \quad \text{Equation (23)}$$

A linear relationship may be found in the z axis of a camera coordinate, parallax d, a focal length and baseline B of the stereoscopic camera. The linear relationship may be described as Equation (24) below:

$$z = \frac{Bf}{d} \quad \text{Equation (24)}$$

Base on Equation (21), (23) and (24), the undetermined parameters $k_g$ and $b_g$ of Equation (22) may be described as below:

$$k_g = \frac{-fk^*}{k^* v_0 + b^*} \quad \text{Equation (25)}$$

$$b_g = \frac{fb}{k^* v_0 + b^*} \quad \text{Equation (26)}$$

In 1170, process 1100 may determine height and angle of the one or more cameras according to the projection equation. The projection equation and the optical axis may satisfy a relationship as described below in connection with FIG. 14-B. A height of the one or more cameras above the ground may be denoted by $h_c$ as described in Equation (27), and an angle of the one or more cameras may be denoted by θ as described in Equation (28):

$$h_c = \frac{|b_g|}{\sqrt{k_g^2 + 1}} \quad \text{Equation (27)}$$

$$\theta = \arctan \frac{1}{-k_g} \quad \text{Equation (28)}$$

In some embodiments, process 1100 for determining a height and angle of one or more cameras may be used in steps 850 and 860 of process 800. For example, the purpose of step 850 of process 800 may be to determine the calibration parameter of one or more cameras, such as a height and an angle of one or more cameras. By performing process 1100, the height and the angle of the one or more cameras can be determined. By using the height and the angle of the one or more cameras and depth information in camera coordinate system, depth information in world coordinate system may be determined.

In some embodiments, process 1100 for determining a height and angle of one or more cameras may be used in step 910 of process 900. For example, the purpose of step 910 in FIG. 9 may be determine the calibration parameter of the one or more cameras, such as a height and an angle of the one or more cameras. By performing process 1100, the height and the angle of the one or more cameras can be determined.

In some embodiments, process 1100 for determining a height and an angle of one or more cameras may be used in step 910 of process 900. Process 900 for generating depth information may be used in step 430 of process 400.

FIG. 12-A and FIG. 12-B is an exemplary pair of images with a selected reference area captured by one or more cameras according to some embodiments of the present disclosure. The pair of images may be captured by two cameras including a left camera and a right camera. A reference plane may be the ground. A baseline of the left camera and the right camera may be parallel with the reference plane. The reference plane is in the view of the left camera and the right camera. A left processed image of the left camera and a right processed image of the right camera can be generate by using a calibration method with pre-calibration parameters. The process of determine the calibration parameter may be performed by calibration parameter determination module 250 illustrated in FIG. 2. A pixel $p_l(u_l, v_l)$ in the left processed image corresponding to a point in the real world, and a pixel $p_r(u_r, v_r)$ in the right processed image corresponding to the same point in the real world may satisfy $v_l = v_r$, and a parallax may be denoted by d as described in Equation (20).

As shown in FIG. 12-A, $G_l$ may be a reference area. A plurality of methods may be used to determine the matching cost, such as SAD (Sum of Absolute Differences) algorithm, MAD (Mean Absolute Differences) algorithm, SSD (Sum of Squared Differences) algorithm, MSD (Mean Square Differences) algorithm, NCC (Normalized Cross Correlation) algorithm, SSDA (Sequential Similarity Detection Algorithm) algorithm, and SATD (Sum of Absolute Transformed Difference) algorithm. In one embodiment, an SAD algorithm may be used to determine a matching cost c(u,v,d) of $l_l(u,v)$ in the second processed image with a parallax d:

$$c(u,v,d) = \sum_{j=v-W}^{v+W} \sum_{i=u-W}^{W} |I_r(i-d,j) - I_l(i,j)| \quad \text{Equation (29)}$$

wherein W refers to a matching window and a preset adjustable value. $I_l(u,v)$ refers to a pixel in the reference area.

FIG. 13-A is a schematic diagram of $G_{VD}$ according to some embodiments of the present disclosure. The value of $G_{VD}$ stands for an average matching cost of the pixels of which the parallax is d in a u direction in the second processed image. As shown in FIG. 13-A, each point $G_{VD}(d,v)$ in FIG. 13-A may satisfy Equation (30):

$$G_{VD}(d, v) = \sum_{u=W_l}^{W_r} \frac{c(u, v, d)}{W_r - W_l} \quad \text{Equation (30)}$$

wherein $W_l$ refers to a left margin of $G_l$ in u direction, and $W_r$ refers to a right margin of $G_l$ in u direction.

FIG. 13-B is a schematic of $d^*(v)$ determined in $G_{VD}$ according to some embodiments of the present disclosure. The locations of the minimum matching cost points in a row $d^*(v)$ may satisfy Equation (31):

$$d^*(v) = \min_d G_{VD}(d, v) \quad \text{Equation (31)}$$

As shown in FIG. 13-B, $d^*(v)$ corresponding to the reference area $G_l$ may be a line in some situation. The line may satisfy Equation (32):

$$d = kv + b \quad \text{Equation (32)}$$

wherein k and b is determined by fitting from $d^*(v)$, which includes noise for the error in matching process.

In one embodiment, a RANSACA (RANdom SAmple Consensus) method may be used to reduce the influence of noise. Randomly select two points from $d^*(v)$, which can be described as $p_1(d_1,v_1)$ and $p_2(d_2,v_2)$. If $v_1=v_2$, then select another two points. If $v_1 \neq v_2$, then the parameter of the line equation (32) may be described as below:

$$k = \frac{d_2 - d_1}{v_2 - v_1} \quad \text{Equation (33)}$$

$$b = d_1 - kv_1 \quad \text{Equation (34)}$$

If a distance between a point $p_0(d_0,v_0)$ in $d^*(v)$ and the line $d=kv+b$ is smaller than a preset threshold as describes in Equation (35), the point $p_0(d_0,v_0)$ may be classified as an interior point of a line model (k,b).

$$\frac{|kv_0 - d_0 + b|}{\sqrt{k^2 + 1}} < \varepsilon \quad \text{Equation (35)}$$

FIG. 13-C is a schematic diagram of $d=k^*v+b^*$ according to some embodiments of the present disclosure. $d=k^*v+b^*$ may be used to describe a determined line model. The process of determine the determined line model may include the following operations. Traversal may determine a distance between a point $p_0(d_0,v_0)$ in $d^*(v)$ and the line $d=kv+b$ of a line model (k,b). The number of interior points may then be sampled or recorded according to the determination result of step one. Repeat the above two operations. In one embodiment the number of repetition may be m times of the height of $G_l$. For example, m may be 10 or 20. The determined line model $(k^*,b^*)$ may be determine by selecting a line model which include a maximum number of interior points.

FIG. 14-A is a schematic diagram of a relationship of a camera coordinate and a world coordinate according to some embodiments of the present disclosure. As shown in FIG. 14-A, z axis of a camera coordinate may be parallel with optical axis of a camera, and y axis may be on a vertical direction. The projection equation of the optical axis of the camera in the ground plane may be expressed as Equation (22).

FIG. 14-B is a schematic diagram of geometrical relations between a height and an angle of the one or more cameras according to some embodiments of the present disclosure.

FIG. 15-A and FIG. 15-B illustrate two exemplary images produced by rectification according to some embodiments of the present disclosure. As illustrated in FIG. 15-A and FIG. 15-B, the vertical coordinates of corresponding pixels in the image coordinate system in the two images are equal.

FIG. 16-A illustrates an exemplary image produced by a process of first detection information generation according to some embodiments of the present disclosure. As illustrated in FIG. 16-A, the process of first detection information generation detected the location information of vehicles in the image, but the location information is not accurate. FIG. 16-B illustrates an exemplary image produced by a process of depth information determination according to some embodiments of the present disclosure. FIG. 16-C illustrates an exemplary image produced by a process of second detection information generation based on the first detection information and the depth information according to some embodiments of the present disclosure. As illustrated in FIG. 16-C, the process of second detection information generation detected the location information of vehicles in the image, and the second detection information is more accurate than the first detection information.

What is claimed is:

1. A method for binocular stereo vision implemented on a computing device including one or more processors and one or more storage devices, the method comprising:
   acquiring a pair of images including a first image and a second image, the pair of images being captured by one or more cameras;
   determining a plurality of feature images according to the first image;
   determining one or more features of an object in the first image according to a training model and the plurality of feature images;
   determining a first area in the first image, the first area including at least one of the determined one or more features;
   obtaining depth information of the determined first area based on the first and second images; and
   determining a second area in the first image based on the determined first area and depth information, the second area including at least one of the determined first area.

2. The method of claim 1, wherein acquiring the pair of images including the first image and the second image comprises:
   identifying an object in view of a first camera;
   adjusting a parameter of a second camera so that the object appears in view of the second camera; and
   acquiring the pair of images captured by the first camera and the second camera when the object appears in view of both the first and second cameras.

3. The method of claim 1, further comprises obtaining the training model by:

obtaining a plurality image samples;
generating an initial root filter according to the samples;
generating an updating root filter according to the initial root filter;
generating a part filter according to the updating root filter; and
generating the training model according to the samples and the part filter.

4. The method of claim 1, wherein the obtaining of the depth information of the determined first area based on the first and second images comprises:
processing the pair of images to generate a pair of processed images, wherein vertical coordinates in an image coordinate system of two corresponding pixels in the pair of processed images are equal;
generating a pair of processed images according to the pair of images;
determining a target pixel in the first area in a first processed image;
determining a matching pixel of the target pixel in a second processed image;
determining depth information of the target pixel in a camera coordinate system according to the matching pixel;
determining a height and a pitch angle of at least one of the one or more cameras; and
transforming the depth information in the camera coordinate system into depth information in a world coordinate system according to the height and the pitch angle.

5. The method of claim 4, wherein an origin of the image coordinate system is a pixel in a highest position in a top left corner of the first image, an origin of the camera coordinate system is an optical center of the camera capturing the first image, and an origin of the world coordinate system is a point in the real world.

6. The method of claim 4, wherein lenses of the one or more cameras are fixed lenses, the fixed lenses being non-rotatable along a first axis, a second axis, or a third axis, wherein the first axis, the second axis, and the third axis are perpendicular to each other.

7. The method of claim 4, wherein the determining of the height and the pitch angle of the at least one of the one or more cameras comprises:
identifying a third area in the first processed image;
determining a parallax between a first pixel in the third area and a second pixel corresponding to the first pixel in the second processed image;
determining a relationship between a vertical coordinate of the first pixel in the image coordinate system and the parallax;
determining a projection equation according to the relationship; and
determining the height and the pitch angle of the at least one of the one or more cameras according to the projection equation.

8. The method of claim 2, wherein the obtaining of the depth information of the determined first area based on the first and second images comprises:
obtaining a calibration parameter of the first camera and the second camera, the calibration parameter including a yaw angle, a pitch angle, a focal length, or a three dimensional coordinate of an origin of a camera coordinate system in a world coordinate system of the first camera and the second camera in an initial state;
determining a pair of pixels in the pair of images;
obtaining, when the object appears in view of both the first and second cameras, an adjustment parameter of at least one of the first camera and the second camera, the adjustment parameter including a yaw angle, a pitch angle, or a focal length of the first camera and the second camera; and
determining depth information of the pair of pixels in the world coordinate system according to the calibration parameter and the adjustment parameter.

9. The method of claim 8, wherein the first camera and the second camera have at least one rotatable lens, the rotatable lens being a lens rotatable along a first axis, a second axis or a third axis, wherein the first axis, the second axis, and the third axis are perpendicular to each other.

10. The method of claim 9, wherein the initial state is a state that rotation angles along the first axis, the second axis, and the third axis of the at least one rotatable lens of the first camera and the second camera are 0.

11. A system for binocular stereo vision comprising:
one or more cameras;
one or more storage devices comprising a set of instructions; and
one or more processors configured to communicate with the one or more storage devices, wherein when executing the set of instructions, the one or more processors are directed to cause the system to:
acquire a pair of images including a first image and a second image, the pair of images being captured by one or more cameras;
determine a plurality of feature images according to the first image;
determine one or more features of an object in the first image according to a training model and the plurality of feature images;
determine a first area in the first image, the first area including at least one of the determined one or more features;
obtain depth information of the determined first area based on the first and second images; and
determine a second area in the first image based on the determined first area and depth information, the second area including at least one of the determined first area.

12. The system of claim 11, wherein to acquire the pair of images including the first image and the second image, the one or more processors are directed to cause the system to:
identify an object in view of a first camera;
adjust a parameter of a second camera so that the object appears in view of the second camera; and
acquire the pair of images captured by the first camera and the second camera when the object appears in view of both the first and second cameras.

13. The system of claim 11, wherein the one or more processors are further directed to cause the system to obtain the training model by:
obtaining a plurality image samples;
generating an initial root filter according to the samples;
generating an updating root filter according to the initial root filter;
generating a part filter according to the updating root filter; and
generating the training model according to the samples and the part filter.

14. The system of claim 11, wherein to obtain the depth information of the determined first area based on the first and second images, the one or more processors are directed to cause the system to:

process the pair of images to generate a pair of processed images, wherein vertical coordinates in an image coordinate system of two corresponding pixels in the pair of processed images are equal;
generate a pair of processed images according to the pair of images;
determine a target pixel in the first area in a first processed image;
determine a matching pixel of the target pixel in a second processed image;
determine depth information of the target pixel in a camera coordinate system according to the matching pixel;
determine a height and a pitch angle of at least one of the one or more cameras; and
transform the depth information in the camera coordinate system into depth information in a world coordinate system according to the height and the pitch angle.

15. The system of claim 14, wherein an origin of the image coordinate system is a pixel in a highest position in a top left corner of the first image, an origin of the camera coordinate system is an optical center of the camera capturing the first image, and an origin of the world coordinate system is a point in the real world.

16. The system of claim 14, wherein lenses of the one or more cameras are fixed lenses, the fixed lenses being non-rotatable along a first axis, a second axis, or a third axis, wherein the first axis, the second axis, and the third axis are perpendicular to each other.

17. The system of claim 14, wherein to determine the height and the pitch angle of the at least one of the one or more cameras, the one or more processors are directed to cause the system to:
identify a third area in the first processed image;
determine a parallax between a first pixel in the third area and a second pixel corresponding to the first pixel in the second processed image;
determine a relationship between a vertical coordinate of the first pixel in the image coordinate system and the parallax;
determine a projection equation according to the relationship; and
determine the height and the pitch angle of the at least one of the one or more cameras according to the projection equation.

18. The system of claim 12, wherein to obtain the depth information of the determined first area based on the first and second images, the one or more processors are directed to cause the system to:
obtain a calibration parameter of the first camera and the second camera, the calibration parameter including a yaw angle, a pitch angle, a focal length, or a three dimensional coordinate of an origin of a camera coordinate system in a world coordinate system of the first camera and the second camera in an initial state;
determine a pair of pixels in the pair of images;
obtain, when the object appears in view of both the first and second cameras, an adjustment parameter of at least one of the first camera and the second camera, the adjustment parameter including a yaw angle, a pitch angle, or a focal length of the first camera and the second camera; and
determine depth information of the pair of pixels in the world coordinate system according to the calibration parameter and the adjustment parameter.

19. The system of claim 18, wherein the first camera and the second camera have at least one rotatable lens, the rotatable lens being a lens rotatable along a first axis, a second axis or a third axis, wherein the first axis, the second axis, and the third axis are perpendicular to each other.

20. A non-transitory computer readable medium embodying a computer program product, the computer program product comprising instructions configured to cause a computing device to:
acquire a pair of images including a first image and a second image, the pair of images being captured by one or more cameras;
obtain a training model;
determine a plurality of feature images according to the first image;
determine one or more features of an object in the first image according to the training model and the plurality of feature images;
determine a first area in the first image, the first area including at least one of the determined one or more features;
obtain depth information of the determined first area based on the first and second images; and
determine a second area in the first image based on the determined first area and depth information, the second area including at least one of the determined first area.

* * * * *